United States Patent
Ju

(10) Patent No.: US 7,555,510 B2
(45) Date of Patent: Jun. 30, 2009

(54) SCALABLE SYSTEM FOR INVERSE DISCRETE COSINE TRANSFORM AND METHOD THEREOF

(75) Inventor: Chi-Cheng Ju, Hsin-Chu (TW)

(73) Assignee: MediaTek, Inc., Hsin-Chu (TW)

( * ) Notice: Subject to any disclaimer, the term of this patent is extended or adjusted under 35 U.S.C. 154(b) by 718 days.

(21) Appl. No.: 10/838,247

(22) Filed: May 5, 2004

(65) Prior Publication Data
US 2005/0004962 A1 Jan. 6, 2005

(30) Foreign Application Priority Data
Jul. 4, 2003 (TW) .............................. 92118423 A

(51) Int. Cl.
*G06F 17/14* (2006.01)

(52) U.S. Cl. ..................... 708/402; 708/400
(58) Field of Classification Search .......... 708/400–409
See application file for complete search history.

(56) References Cited

U.S. PATENT DOCUMENTS

| | | | |
|---|---|---|---|
| 5,565,921 A | 10/1996 | Sasaki et al. | |
| 5,883,823 A | 3/1999 | Ding | |
| 6,052,703 A * | 4/2000 | Redford | 708/402 |
| 6,137,916 A | 10/2000 | Chang et al. | |
| 6,327,602 B1 * | 12/2001 | Kim | 708/401 |
| 6,397,235 B1 * | 5/2002 | Van Eijndhoven et al. | 708/401 |
| 6,420,979 B1 | 7/2002 | Katayama | |
| 6,732,131 B1 * | 5/2004 | Uetani | 708/402 |
| 6,996,595 B2 * | 2/2006 | LaRocca et al. | 708/400 |
| 7,136,890 B2 * | 11/2006 | Im | 708/401 |
| 2002/0010729 A1 * | 1/2002 | Dixit et al. | 708/402 |
| 2003/0084080 A1 * | 5/2003 | Hong | 708/400 |

* cited by examiner

*Primary Examiner*—Chat C Do
(74) *Attorney, Agent, or Firm*—Patterson & Sheridan, LLP; Keith P. Taboada

(57) ABSTRACT

The present invention provides an input data control method and system for a data processing system. The system comprises at least one basic operation unit (BOU) and is used for transforming one input matrix X into data in a plurality of specified columns in an output matrix Y via an inverse discrete cosine transform procedure. The method generates and outputs a transform control signal together with the input matrix to at least one of the BOUs. A new transform control signal is generated according to the received transform control signal, and outputted together with the input matrix X, to other following BOUs. The step of generating the new transform control signals is repeated until each specific column of the output matrix Y is decoded by a corresponding BOU. A basic operation procedure is then performed, and the received input matrix is decoded to obtain the data in the specified columns corresponding to the transform control signal.

37 Claims, 9 Drawing Sheets

SCALABLE SYSTEM FOR INVERSE DISCRETE COSINE TRANSFORM AND METHOD THEREOF

BACKGROUND OF THE INVENTION

1. Field of the Invention

The present invention relates to a data processing system and method thereof, especially to utilize the inverse discrete cosine transform (IDCT) procedure to perform the system and method thereof of the IDCT procedure.

2. Description of the Prior Art

The digital video codec of the prior art utilizes a discrete cosine transform (DCT) procedure to compress digital data. For example, the international image code/decode standard (MPEG1, MPEG2, MPEG4, etc.) first divides each picture into N×N blocks, and N is equal to 8 in general. Then, in the image recording procedure, the block data $y_{h,v}$ of the time domain are transformed to the discrete cosine transform coefficients $x_{k,l}$ of the frequency domain by the DCT procedure.

The decompression and compression procedures of digital data of digital image codec of the prior art are opposite to each other. The digital image codec performs the 8-8 inverse discrete cosine transform (IDCT) procedure on the data flow to proceed the inverse transform procedure. The equation of the 8-8 IDCT procedure is:

$$y_{h,v} = \sum_{k=0}^{7}\sum_{l=0}^{7} c(k)c(l) * x_{k,l} * \cos\left(\frac{2h+1}{16}k\pi\right) * \cos\left(\frac{(2v+1)}{16}l\pi\right)$$

wherein $$c(0) = \frac{1}{2\sqrt{2}}, c(i) = 1/2;$$

i is an integer, and i=1~7. Please refer to U.S. Pat. No. 5,565,921 for the detail process of the digital image coder/decoder utilizing DCT procedure and IDCT procedure to compress and decompress digital images.

The main drawback of the digital image codec of the prior art is that the prior art uses the conventional row column decomposition method to divide 2-D IDCT operation into two 1-D IDCT operations. Therefore, the digital image codec of the prior art must wait for all 64 outcomes of the first 1-D IDCT operation to be obtained before performing a second 1-D IDCT operation. This waiting period prolongs the time to decompress digital images in the prior art. Moreover, the prior art further needs a buffer memory to buffer the 64 intermediate values, so the cost of the digital image codec is increased.

As mentioned in "Case study on discrete cosine transformation, 2D-DCT with linear processor arrays" reported by Ullrich Totzek, Fred Matthiesen, and Michael Boehner, etc. on EEC SPRITE research report A.2.c/Siemens/Y2m6/4, Jun. 1, 1990, this prior art enables the digital image codec to perform the second 1-D DCT operation on the partial outcomes of the first 1-D DCT operation while the first 1-D DCT operation is still processing other outcomes. Since the second 1-D DCT operation can be performed without waiting to obtain all the 64 outcomes of the first 1-D DCT operation, the time of calculation needed by the prior art can be substantially reduced.

However, the prior art illustrates a hardware architecture of a DCT processor and it is not a scalable architecture. Since the demand on the throughput of IDCT operation may vary with different systems. In the case that if the throughput of IDCT operation needs to be further speed up, the hardware of the prior art usually has to be redesigned. It will waste the hardware design resources, extend the design cycle, and fail to meet the time-to-market requirement.

Therefore, the major objective of the present invention is to provide a scalable system for IDCT and method thereof to solve the problems of the prior art.

SUMMARY OF THE INVENTION

The objective of the present invention is to provide an input data control method and system thereof to solve all the drawbacks of the prior art.

The other objective of the present invention is to provide an IDCT system and method thereof which possess scalability property and can effectively shorten the process time to decompress the digital image.

The present invention provides an input data control method and system thereof. The input data control method generates a transform control signal first and outputs the transform control signal together with the input matrix to at least one of the basic operation units (BOUs). A new transform control signal is then generated by a transform control signal update procedure according to the received transform control signal and is outputted together with the input matrix X to other following BOUs. The step of generating new transform control signals is repeated until each specific column of the output matrix Y is specified to be decoded by a corresponding BOU. A basic operation procedure is then performed, and the received input matrix is decoded according to the received transform control signals to obtain the data in the specified columns corresponding to the transform control signals.

According to the control method of the present invention, the present invention can solve the drawback that the data processing system of the prior art is not scalable. The present invention can increase and integrate a plurality of BOUs, without redesigning the hardware, according to different requirements on the throughput of IDCT procedures in different systems. The present invention can enable a plurality of BOUs to perform the operation of the IDCT procedure at the same time, so as to shorten the calculation time. The present invention can solve the problem in the prior art that the second IDCT procedure must wait for all the outcomes of the first IDCT procedure and therefore increases the total decompression process time. The present invention can reduce the capacity of the buffer memory of the prior art and it's cost of production. Furthermore, the present invention can further reduce the operation time and the necessary hardware circuit by sharing operation procedure, thus reducing a lot of the image processing time and the cost of device.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a data processing system and method thereof for transforming one input matrix X, which has a plurality of discrete cosine transform coefficients (DCT coefficients), into data in a plurality of specified columns in an output matrix Y via an inverse discrete cosine transform (IDCT) procedure. The data processing system is applied to the digital codec in the digital image device of the prior art, such as MPEG1, MPEG2, MPEG4, etc.

According to a preferred embodiment of the present invention, the IDCT procedure is an 8-8 IDCT procedure. For the convenience of description, the input matrix is represented as an input matrix X, and the output matrix is represented as an output matrix Y in the following specification. The input matrix X has 8 rows and 8 columns of discrete cosine transform coefficients $x_{k,l}$ (k=0~7, l=0~7). The input matrix X is represented as the following:

$$X = \begin{bmatrix} x_{0,0} & x_{0,1} & x_{0,2} & x_{0,3} & x_{0,4} & x_{0,5} & x_{0,6} & x_{0,7} \\ x_{1,0} & x_{1,1} & x_{1,2} & x_{1,3} & x_{1,4} & x_{1,5} & x_{1,6} & x_{1,7} \\ x_{2,0} & x_{2,1} & x_{2,2} & x_{2,3} & x_{2,4} & x_{2,5} & x_{2,6} & x_{2,7} \\ x_{3,0} & x_{3,1} & x_{3,2} & x_{3,3} & x_{3,4} & x_{3,5} & x_{3,6} & x_{3,7} \\ x_{4,0} & x_{4,1} & x_{4,2} & x_{4,3} & x_{4,4} & x_{4,5} & x_{4,6} & x_{4,7} \\ x_{5,0} & x_{5,1} & x_{5,2} & x_{5,3} & x_{5,4} & x_{5,5} & x_{5,6} & x_{5,7} \\ x_{6,0} & x_{6,1} & x_{6,2} & x_{6,3} & x_{6,4} & x_{6,6} & x_{6,6} & x_{6,7} \\ x_{7,0} & x_{7,1} & x_{7,2} & x_{7,3} & x_{7,4} & x_{7,5} & x_{7,6} & x_{7,7} \end{bmatrix}$$

The input matrix X is transformed into the output matrix Y via the 8-8 IDCT procedure. The output matrix Y has 8 rows and 8 columns of data $y_{h,v}$ (h=0~7, v=0~7). The output matrix Y is represented as the following:

$$Y = \begin{bmatrix} y_{0,0} & y_{0,1} & y_{0,2} & y_{0,3} & y_{0,4} & y_{0,5} & y_{0,6} & y_{0,7} \\ y_{1,0} & y_{1,1} & y_{1,2} & y_{1,3} & y_{1,4} & y_{1,5} & y_{1,6} & y_{1,7} \\ y_{2,0} & y_{2,1} & y_{2,2} & y_{2,3} & y_{2,4} & y_{2,5} & y_{2,6} & y_{2,7} \\ y_{3,0} & y_{3,1} & y_{3,2} & y_{3,3} & y_{3,4} & y_{3,5} & y_{3,6} & y_{3,7} \\ y_{4,0} & y_{4,1} & y_{4,2} & y_{4,3} & y_{4,4} & y_{4,5} & y_{4,6} & y_{4,7} \\ y_{5,0} & y_{5,1} & y_{5,2} & y_{5,3} & y_{5,4} & y_{5,5} & y_{5,6} & y_{5,7} \\ y_{6,0} & y_{6,1} & y_{6,2} & y_{6,3} & y_{6,4} & y_{6,6} & y_{6,6} & y_{6,7} \\ y_{7,0} & y_{7,1} & y_{7,2} & y_{7,3} & y_{7,4} & y_{7,5} & y_{7,6} & y_{7,7} \end{bmatrix}$$

Figure 1:
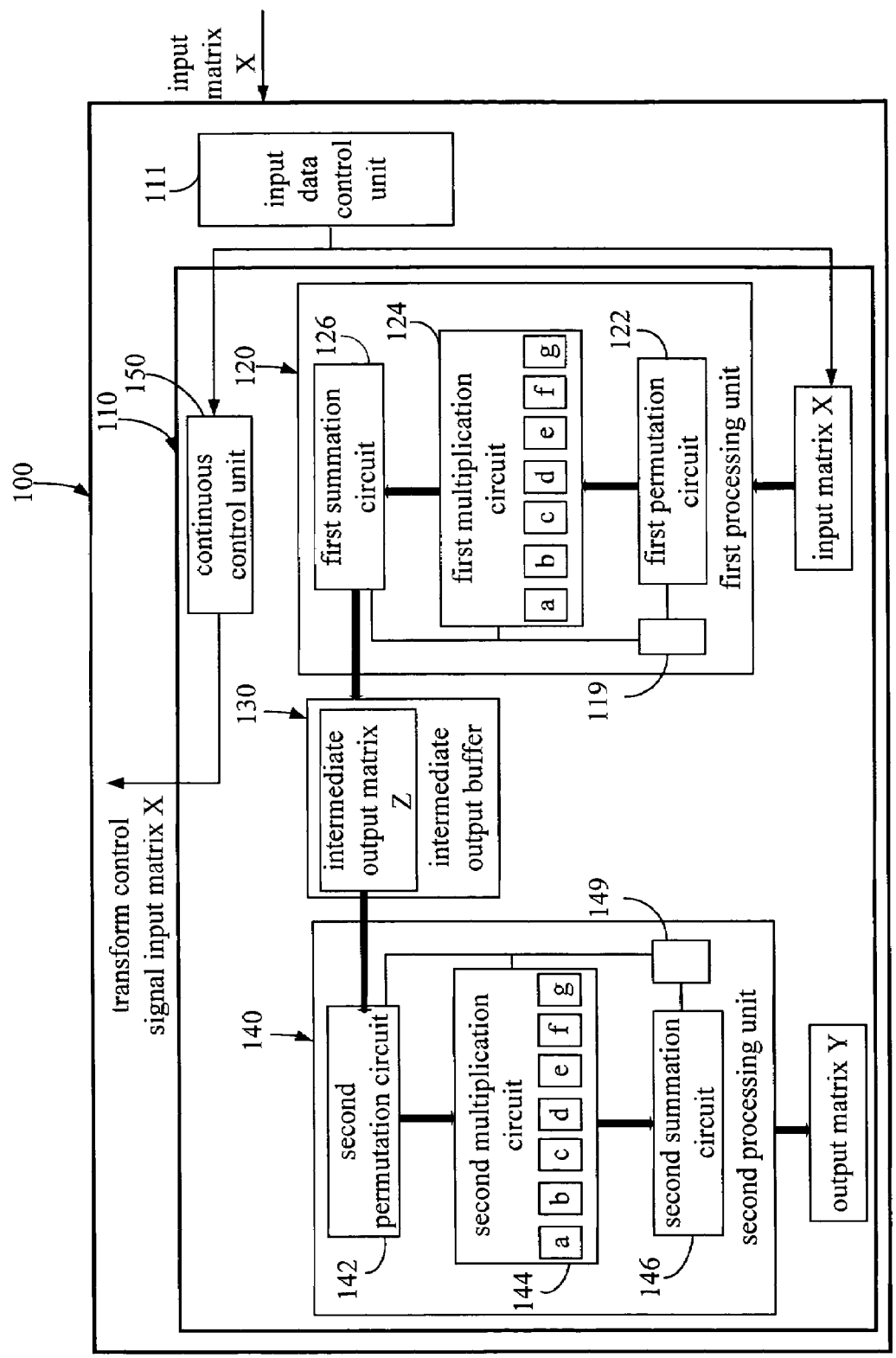
FIG. 1 is a schematic diagram of a data processing system of the preferred embodiment according to the present invention.

Please refer to FIG. 1. FIG. 1 is a schematic diagram of a data processing system of the preferred embodiment according to the present invention. The data processing system 100 comprises at least one basic operation unit (BOU) 110 and one input data control unit 111. The input data control unit 111 is used for outputting the input matrix X and for further generating at least one transform control signal, accompanying the outputting of the input matrix X.

The transform control signals indicate the decoded data in at least one specified column in the output matrix Y respectively after the input matrix X is transformed via the IDCT procedure. According to the embodiment of the present invention, the transform control signals are the column number of at least one specified column in the output matrix Y after the input matrix X is transformed and decoded via the IDCT procedure. For example, if the BOU 110 is set to generate the decoded data in first column of the output matrix Y after receiving the input matrix X, the transform control signal is 1. If the BOU 110 is set to generate the decoded data in the first, third, and fifth columns of the output matrix Y after receiving the input matrix X, the transform control signals are 1, 3, and 5 respectively.

The BOUs are connected to each other. According to the preferred embodiment of the present invention, the BOUs 110 are cascaded to each other. And according to the requirements of different systems, each of the BOUs 110 is capable of connecting to more than one of the other BOUs 110 at the same time.

One of the BOUs 110 receives the input matrix X and the transform control signal outputted from the input data control unit 111 first; it then outputs at least one corresponding new transform control signal, generated from the received transform control signal, together with the input matrix X to the following BOU 110. Each of the BOUs 110 decodes the received input matrix X according to the transform control signals and obtains the data in at least one specified column in the output matrix Y.

Figure 2:
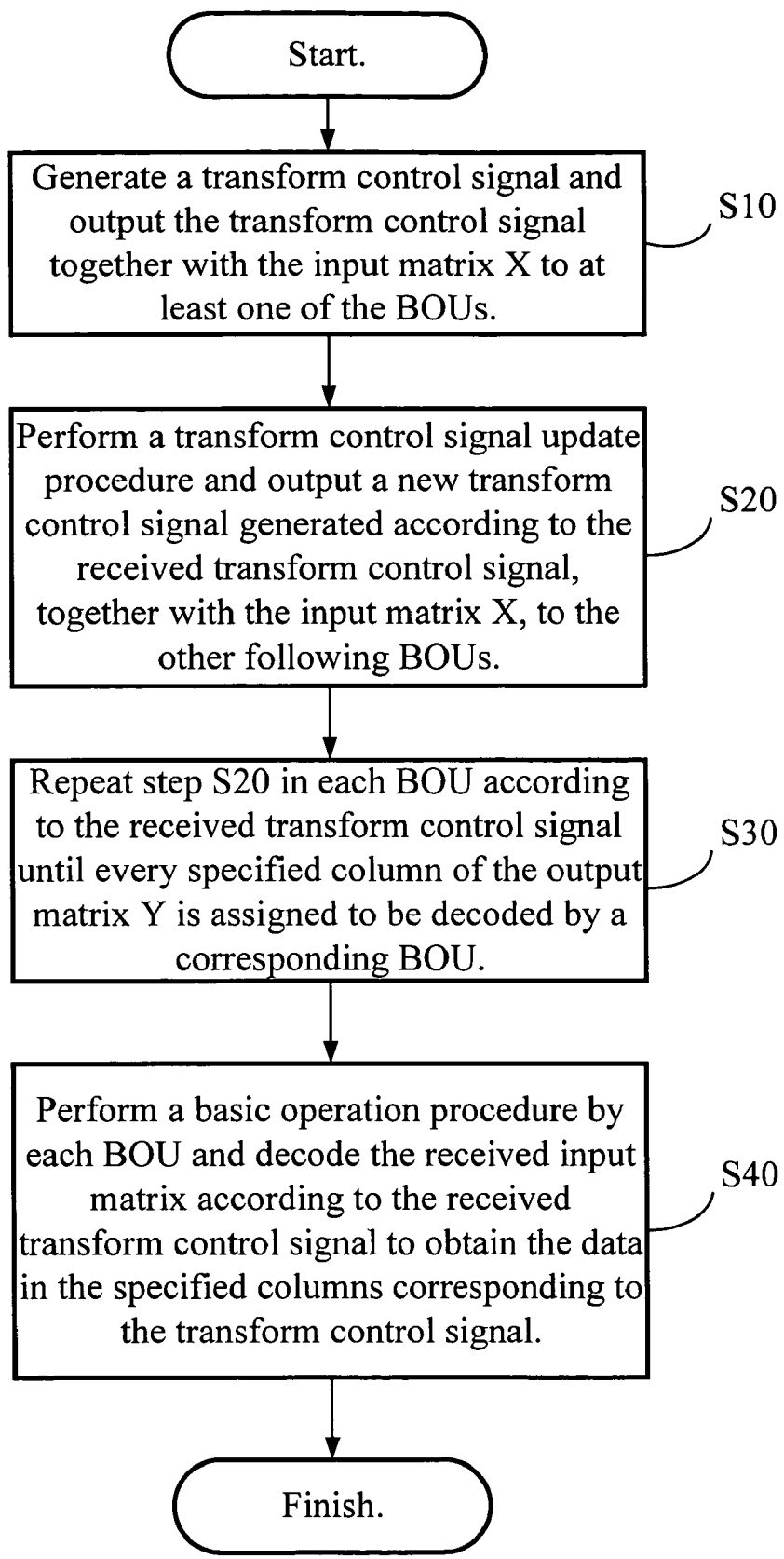
FIG. 2 is a flowchart of the input data control method of the present invention.

Please refer to FIG. 2. FIG. 2 is a flowchart of the input data control method of the present invention. The input data control method of the present invention comprises the following steps:

S10: Generate a transform control signal and output the transform control signal together with the input matrix X to at least one of the BOUs 110.

S20: Perform a transform control signal update procedure and output a new transform control signal generated according to the received transform control signal, together with the input matrix X, to the other following BOUs 110.

S30: Repeat step S20 in each BOU 110 according to the received transform control signal until every specified column of the output matrix Y is assigned to be decoded by a corresponding BOU 110.

S40: Perform a basic operation procedure by each BOU 110 and decode the received input matrix according to the received transform control signal to obtain the data in the specified columns corresponding to the transform control signal.

According to the embodiment of the present invention, the transform control signal update procedure in step S20 is as follows: after receiving the transform control signal, the BOUs 110 add one to the column number of at least one specified column to obtain the new transform control signal. For example, if the transform control signal received by the BOU 110 is 1, the new transform control signal is 2. If the transform control signals received by the BOU 110 are 1, 3, and 5 respectively, the new transform control signals are 2, 4, and 6.

Figure 3:
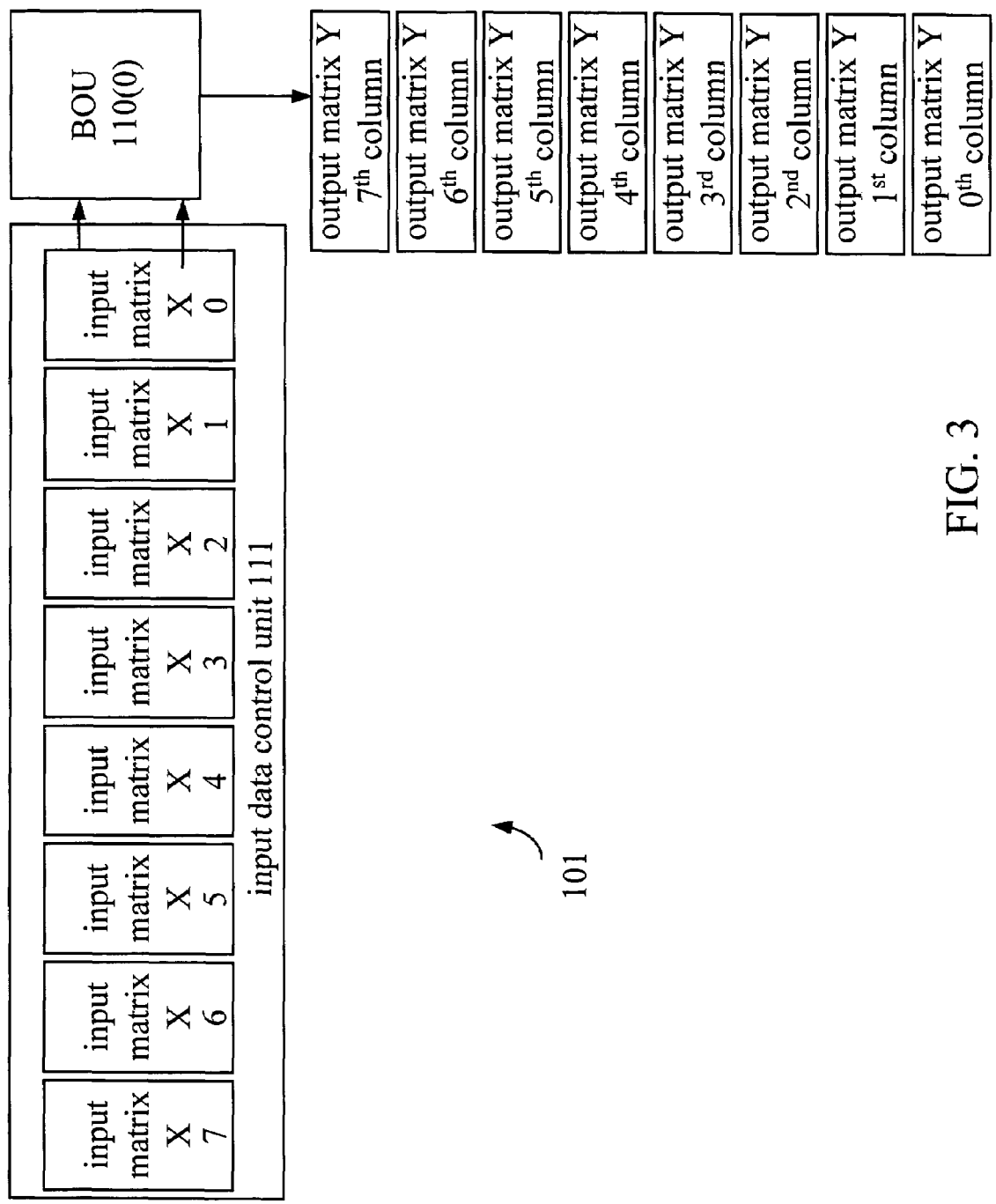
FIG. 3 is a schematic diagram of the relationship between the transform control signals and the decoded output matrix Y while only one BOU is in the data processing system.
Figure 4:
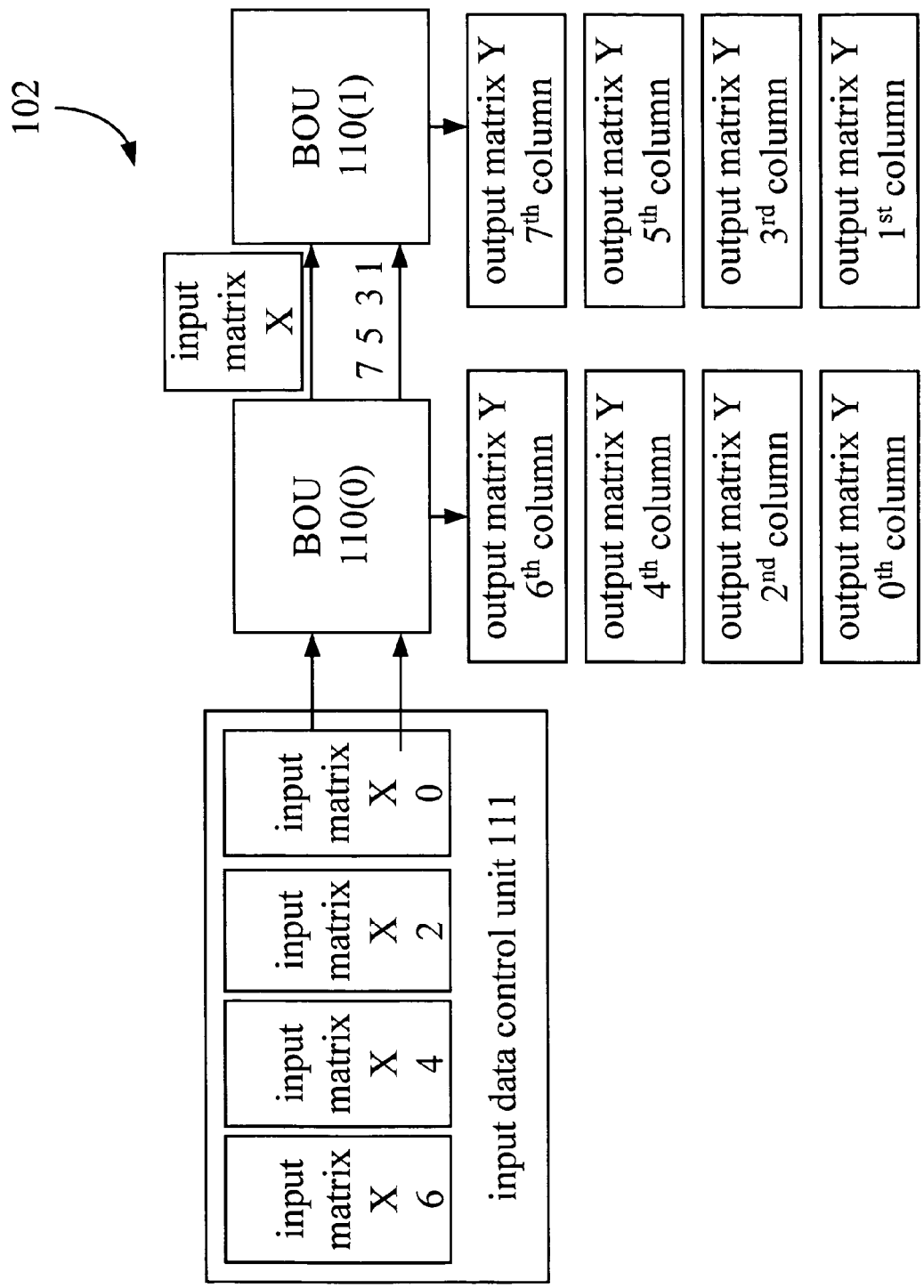
FIG. 4 is a schematic diagram of the relationship between the transform control signals and the decoded output matrix Y while two BOUs are in the data processing system.
Figure 5:
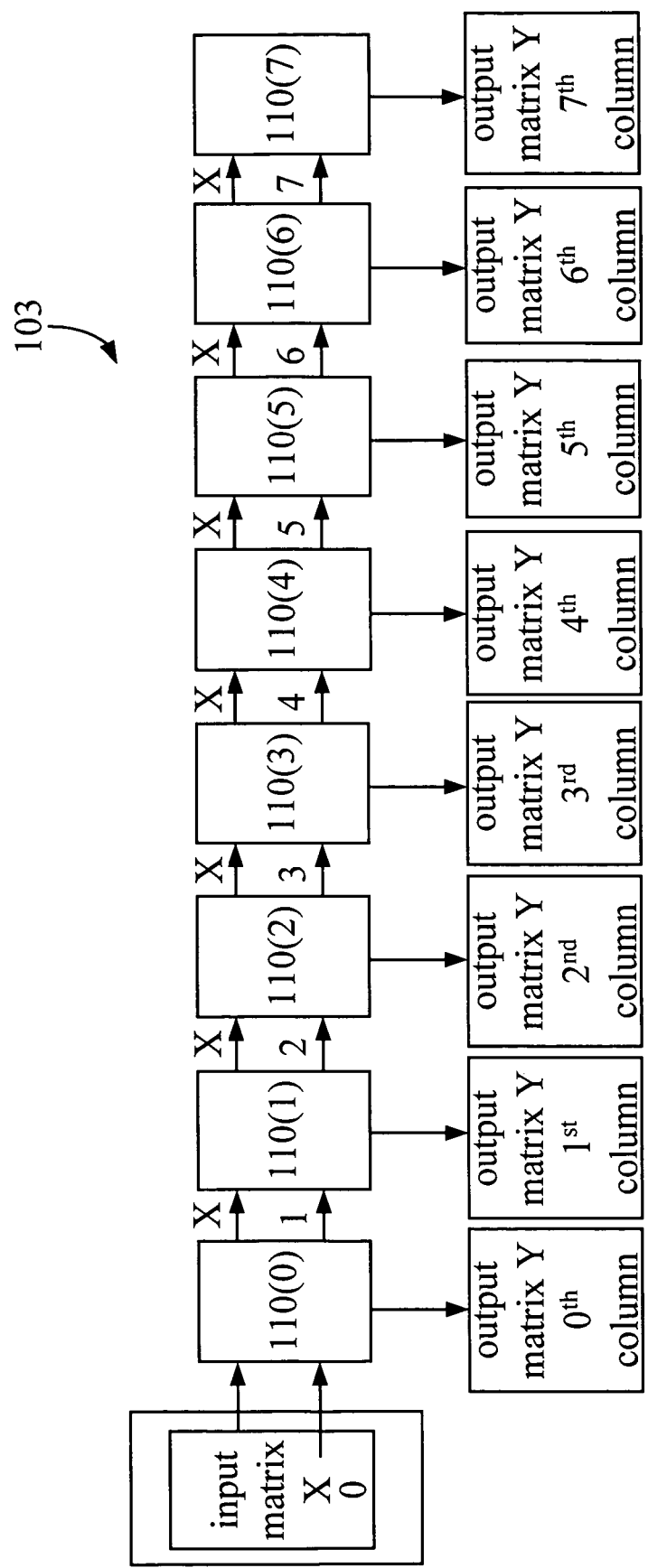
FIG. 5 is a schematic diagram of the relationship between the transform control signals and the decoded output matrix Y while eight BOUs are in the data processing system.

Please refer to FIG. 3, FIG. 4, and FIG. 5. FIG. 3, FIG. 4, and FIG. 5 are the schematic diagrams of the relationship between the specified column number in the output matrix Y decoded by the BOU 110, the transform control signals and the input matrix X according to different embodiment respectively.

Please refer to FIG. 3 first. FIG. 3 is a schematic diagram of the relationship between the transform control signals and the decoded output matrix Y while only one BOU 110(0) is in the data processing system 101. According to the embodiment of FIG. 3, because the output matrix Y has 8 columns of data, the input data control unit 111 re-outputs the input matrix X to the BOU 110(0) for 8 times, thus generating the corresponding transform control signals whenever the input matrix X is outputted to the BOU 110(0), so that the output matrix Y is decoded completely.

Each time when the BOU 110(0) receives one input matrix X, the BOU 110(0) determines the specified column of the output matrix Y to be transformed from the input matrix X via the IDCT procedure, according to the corresponding transform control signals, so as to obtain the data in the specified column of the output matrix Y. As shown in FIG. 3, when the BOU 110(0) receives the first input matrix X with the transform control signal 0, the $0^{th}$ column of the output matrix Y will be obtained. Then, the BOU 110(0) transforms the input matrix X into the data in the $0^{th}$ column of the output matrix Y via the IDCT procedure. After that, when the BOU 110(0) receives the second input matrix X with the transform control signal 1, the $1^{st}$ column of the output matrix Y will be obtained. Then, the BOU 110(0) transforms the input matrix X into the data in the $1^{st}$ column of the output matrix Y via the IDCT procedure. Until the BOU 110(0) transformed the input matrix X sequentially into the data in all the other columns of the output matrix Y, the output matrix Y can be obtained completely.

The requirement on the throughput rate of the IDCT operation in different digital image system is quite different. In the case that higher throughput rate of the IDCT operation is required for a new application and the throughput rate of the embodiment in FIG. 3 may be not high enough for that application, the throughput rate of IDCT operation needs to be further increased. With compared to the lack of scalability of the prior art, the present invention can easily increase throughput rate simply by increasing the number of the BOU according to the throughput requirement without redesigning the hardware.

Please refer to FIG. 4. FIG. 4 is a schematic diagram of the relationship between the transform control signals and the decoded output matrix Y while two BOUs 110(0) and 110(1) exist in the data processing system 102. After receiving the input matrix X, the input data control unit 111 re-outputs the input matrix X for four times to the BOU 110(0). The input data control unit 111 further generates and inputs the transform control signals 0, 2, 4, and 6, corresponding to each input matrix X, to the BOU 110(0).

After receiving each input matrix X, the BOU 110(0) adds one to each transform control signal 0, 2, 4, and 6 to become new transform control signals 1, 3, 5, and 7, and outputs the new transform control signals, together with the input matrix X, to the BOU 110(1). Therefore, the data in each column of the output matrix Y can all be transformed by its corresponding BOU 110.

The BOUs 110(0) and 110(1) then perform the basic operation procedure of step S40 on each received input matrix X simultaneously. According to the transform control signals, the BOU 110(0) calculates and generates the data in the $0^{th}$, $2^{nd}$, $4^{th}$, and $6^{th}$ columns of the output matrix Y in sequence, and the BOU 110(1) calculates and generates the data in the $1^{st}$, $3^{rd}$, $5^{th}$, and $7^{th}$ columns of the output matrix Y in sequence. Because the two BOUs 110 perform the basic operation procedure in parallel, the data processing system 102 can shorten a lot of time needed by the IDCT procedure.

Please refer to FIG. 5. FIG. 5 is a schematic diagram of the relationship between the transform control signals and the decoded output matrix Y while eight BOUs 110(0), 110(1), 110(2), 110(3), 110(4), 110(5), 110(6), and 110(7) are in the data processing system 103. According to the embodiment of FIG. 5, after receiving the input matrix X, the input data control unit 111 only needs to output the input matrix X once, and it generates the corresponding transform control signal to the BOU 110(0). After that, the BOU 110(0) adds one to the received transform control signal 0 to obtain a new transform control signal 1 and outputs the new transform control signal 1, together with the input matrix X, to the BOU 110(1). In the same way, the BOU 110(1) also adds one to the received transform control signal 1 to obtain a new transform control signal 2 and outputs the new transform control signal 2, together with the input matrix X, to the BOU 110(2), and so on. The 8 BOUs receive the transform control signals, which represent the data in 8 columns of the output matrix Y, respectively and decode to obtain the data in the column of the output matrix Y corresponding to the transform control signal, thus obtaining the complete output matrix Y. Therefore, the throughput rate of the IDCT procedure of the data processing system can be shorten substantially.

In the embodiments of FIG. 4 and FIG. 5, the input data control unit 111 and each of the BOUs 110 are all cascaded to each other. However, while the input data control unit 111 or each of the BOUs 110 is capable of connecting to more than one of the other BOUs 110 at the same time, the input data control unit 111 or each of the BOUs 110 generates the corresponding transform control signals and outputs the corresponding transform control signals, together with the input matrix X, to all the following BOUs 110.

The method that each BOU 110 generates the data in a specified column of the output matrix Y will be described in the following. The IDCT procedure comprises a first IDCT procedure and a second IDCT procedure. The first IDCT procedure first transforms the discrete cosine transform coefficients $x_{k,l}$ into an intermediate output matrix Z first. The intermediate output matrix Z has a plurality of intermediate output components $z_{v,k}$. The second IDCT procedure transforms the intermediate output components $z_{v,k}$ into the output matrix Y. The intermediate output components $z_{v,k}$ is represented as the following matrix:

$$Z = \begin{bmatrix} z_{0,0} & z_{0,1} & z_{0,2} & z_{0,3} & z_{0,4} & z_{0,5} & z_{0,6} & z_{0,7} \\ z_{1,0} & z_{1,1} & z_{1,2} & z_{1,3} & z_{1,4} & z_{1,5} & z_{1,6} & z_{1,7} \\ z_{2,0} & z_{2,1} & z_{2,2} & z_{2,3} & z_{2,4} & z_{2,5} & z_{2,6} & z_{2,7} \\ z_{3,0} & z_{3,1} & z_{3,2} & z_{3,3} & z_{3,4} & z_{3,5} & z_{3,6} & z_{3,7} \\ z_{4,0} & z_{4,1} & z_{4,2} & z_{4,3} & z_{4,4} & z_{4,5} & z_{4,6} & z_{4,7} \\ z_{5,0} & z_{5,1} & z_{5,2} & z_{5,3} & z_{5,4} & z_{5,5} & z_{5,6} & z_{5,7} \\ z_{6,0} & z_{6,1} & z_{6,2} & z_{6,3} & z_{6,4} & z_{6,6} & z_{6,6} & z_{6,7} \\ z_{7,0} & z_{7,1} & z_{7,2} & z_{7,3} & z_{7,4} & z_{7,5} & z_{7,6} & z_{7,7} \end{bmatrix}.$$

The equation of the first IDCT procedure is:

$$z_{v,k} = \sum_{l=0}^{7} c(l) * x_{k,l} * \cos\left(\frac{(2v+1)}{16} * l * \pi\right),$$

wherein $$c(0) = \frac{1}{2\sqrt{2}}, c(n) = 1/2,$$

n is integer and n=1~7, v, k, l are integer, and v=0~7, k=0~7, l=0~7.

The equation of the second IDCT procedure is:

$$y_{h,v} = \sum_{k=0}^{7} c(k) * z_{v,k} * \cos\left(\frac{(2h+1)}{16} * k * \pi\right),$$

wherein $$c(0) = \frac{1}{2\sqrt{2}}, c(n) = 1/2,$$

n is integer and n=1~7, h, v, k are integer, and h=0~7, v=0~7, k=0~7.

The first IDCT procedure and the second IDCT procedure are usually operated in matrix form. The first IDCT procedure transforms the input matrix X into the intermediate output matrix Z in the following matrix form: $Z=C_1{}^t X^t$. The second IDCT procedure transforms the intermediate output matrix Z into the output matrix Y in the following matrix form: $Y=C_1{}^t Z^t$. Wherein $X^t$ represents the transpose matrix of the input matrix X, $Z^t$ represents the transpose matrix of the intermediate output matrix Z, and $C_1{}^t$ represents the transpose matrix of a transform matrix $C_1$. Wherein $C_1{}^t$ is represented as the following matrix:

$$C_1^t = \begin{bmatrix} a & b & c & d & a & e & f & g \\ a & d & f & -g & -a & -b & -c & -e \\ a & e & -f & -b & -a & g & c & d \\ a & g & -c & -e & a & d & -f & -b \\ a & -g & -c & e & a & -d & -f & b \\ a & -e & -f & b & -a & -g & c & -d \\ a & -d & f & g & -a & b & -c & e \\ a & -b & c & -d & a & -e & f & -g \end{bmatrix}, \begin{bmatrix} a \\ b \\ c \\ d \\ e \\ f \\ g \end{bmatrix} = \frac{1}{2} \begin{bmatrix} \cos\frac{4\pi}{16} \\ \cos\frac{\pi}{16} \\ \cos\frac{2\pi}{16} \\ \cos\frac{3\pi}{16} \\ \cos\frac{5\pi}{16} \\ \cos\frac{6\pi}{16} \\ \cos\frac{7\pi}{16} \end{bmatrix}.$$

Figure 6:
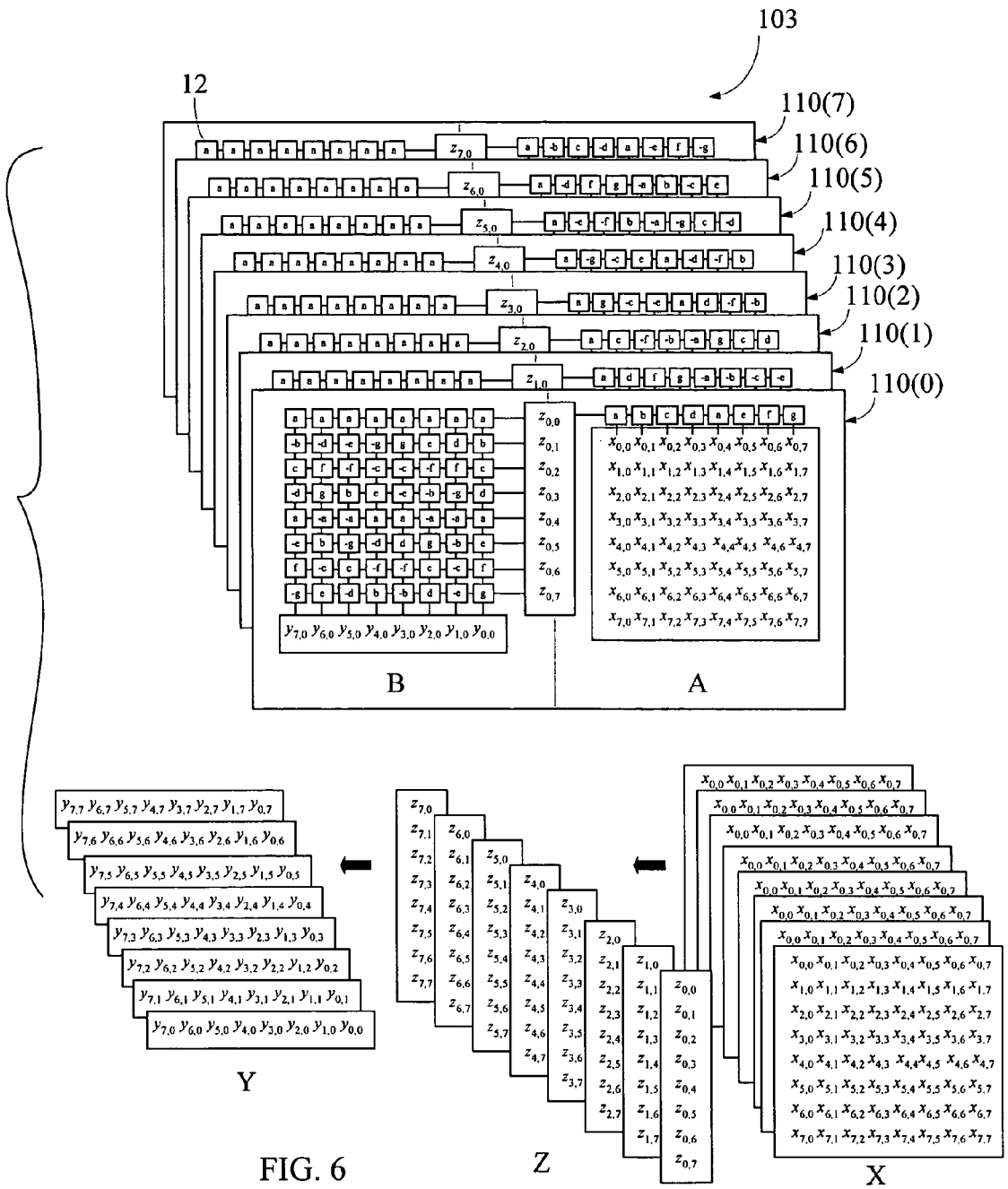
FIG. 6 is a schematic diagram of the operation method of the data processing system shown in FIG. 5.

The embodiment of FIG. 5 is taken as an example in the following to further describe the operation method of the data processing system of the present invention. Please refer to FIG. 6. FIG. 6 is a schematic diagram of the operation method of the data processing system 103 shown in FIG. 5. The 8 planes in FIG. 6 represent 8 BOUs 110(0), 110(1), 110(2), 110(3), 110(4), 110(5), 110(6), and 110(7) in FIG. 5 and are used to calculate the $0^{th}$ column to the $7^{th}$ column of the output matrix Y respectively. Part A in FIG. 6 represents the process of transforming the discrete cosine transform coefficients $x_{k,l}$ into the intermediate output components $z_{v,k}$. Part B in FIG. 6 represents the process of transforming the intermediate output components $z_{v,k}$ into a specified column of the output matrix Y.

Taking the plane 110(0) as an example, please first refer to part A of the plane 110(0). The BOU 110(0) receives the transform control signal, which is a value of 0 and the input matrix X outputted by the input data control unit 111 at the same time. The BOU 110(0) first operates the discrete cosine transform coefficients $x_{k,l}$ (k=0, l=0~7) of the $0^{th}$ row of the input matrix X. The BOU 110(0) multiplies each $x_{k,l}$ by its corresponding transform coefficients (a, b, c, d, a, e, f, g) in the corresponding matrix $C_1{}^t$ and then sums up the outcomes to obtain the first data $z_{0,0}$ of $z_{v,k}$ (v=0, k=0~7) in the $0^{th}$ row of the intermediate output matrix Z. The operation equation is represented as the following:

$$x_{0,0}*a+x_{0,1}*b+x_{0,2}*c+x_{0,3}*d+x_{0,4}*a+x_{0,5}*e+x_{0,6}*f+x_{0,7}*g=z_{0,0}$$

In a similar way, when the BOU 110(0) receives the discrete cosine transform coefficients in the other rows of the input matrix X in sequence, it calculates these coefficients via $Z=C_1{}^t X^t$ and then all data of $z_{v,k}$ (v=0, k=0~7) in the $0^{th}$ row of the intermediate output matrix Z can be obtained completely.

After obtaining the intermediate output components in the $0^{th}$ row completely, please refer to part B of 110(0). The BOU 110(0) performs the following equation:

$$z_{0,0}*a+z_{0,1}*b+z_{0,2}*c+z_{0,3}*d+z_{0,4}*a+z_{0,5}*e+z_{0,6}*f+z_{0,7}*g=y_{0,0}.$$

The first data $y_{0,0}$ of $y_{h,v}$ (v=0, h=0~7) in the $0^{th}$ column of the output matrix Y can be obtained via the second IDCT procedure. In the same way, the BOU 110(0) can obtain complete data of $y_{h,v}$ (v=0, h=0~7) in the $0^{th}$ column of the output matrix Y indicated by the transform control signal via $Y=C_1{}^t Z^t$.

Following the same procedures, as the other planes shown in FIG. 5, each of the BOUs 110 receives the discrete cosine transform coefficients $x_{k,l}$ of the input matrix X and the corresponding transform control signal in sequence. Each of the BOUs 110 further calculates the data in the $0^{th}$ to $7^{th}$ column of the output matrix Y respectively to obtain the output matrix Y completely.

The digital image codec of the prior art often uses row column decomposition method, which obtains one column of $z_{v,k}$ after inputting one row of the discrete cosine transform coefficients $x_{k,l}$ each time. However, it needs one row of $z_{v,k}$ to obtain one column of $y_{h,v}$. For example, while inputting the discrete cosine transform coefficients $x_{k,l}$ (k=0, l=0~7) of the $0^{th}$ row, the prior art generates $z_{v,k}$ (v=0~7, k=0) of the $0^{th}$ column via the matrix $Z=C_1{}^t X^t$. However, it needs to output $z_{v,k}$ (v=0, k=0~7) of the $0^{th}$ row to obtain $y_{h,v}$ (v=0, h=0~7) of the $0^{th}$ column. Therefore, the prior art has to wait until the intermediate output matrix Z in FIG. 5 is calculated completely and uses a buffer memory with high capacity to buffer 8 rows and 8 columns of the intermediate output matrix Z. Then, the prior art outputs each row of $z_{v,k}$ to part B in sequence to generate the data $y_{h,v}$. Moreover, the prior art causes a problem that while the operation circuit of part A is working, the operation circuit of part B is idle. It not only takes a lot of time to de-compress the image data but also reduces the efficiency of the hardware of the digital image codec. Furthermore, the buffer memory with high capacity will increase the cost of the apparatus.

In contrast, in the data processing system of the present invention, each of the BOUs 110 obtains a specified row of the intermediate output matrix Z, then directly proceeds to perform the calculation of the operation circuit of part B, thus shortening the calculation time of the IDCT procedure of the prior art.

The circuit structure and operation method of the BOUs 110 are described in the following. Please refer to FIG. 1. Each of the BOUs 110 comprises a first processing unit 120, an intermediate output buffer 130, and a second processing unit 140.

According to the preferred embodiment, each of the BOUs 110 can further comprise a continuous control unit 150. The continuous control unit 150 is used for outputting the input matrix X to the other continuous control units 150 of the BOUs 110 and for further generating at least one new transform control signal via the transform control signal update procedure to accompany the outputting of the input matrix X.

According to the other preferred embodiment of the present invention (not shown in FIG. 1), the data processing system of the present invention has at least one input data control unit 111. Each of the input data control units 111 is integrated in each of the BOUs 110 respectively. The function of the input data control unit 111 integrated in the BOU 110 is the same as the continuous control unit 150. Each of the input data control units 111 is used for outputting the input matrix X to the other input data control units 111 and for further generating at least one transform control signal to accompany the outputting of the input matrix X. For this embodiment, the input data control unit 111 shown in FIG. 1 should also be integrated in the BOU 110.

Please refer to the embodiment of FIG. 1. The first processing unit 120 is used for calculating the discrete cosine transform coefficients $x_{k,l}$ in each row of the input matrix X via the first IDCT procedure and outputting the outcome to the intermediate output buffer 130 to be buffered. The intermediate output buffer 130 is used for buffering the intermediate output components $z_{v,k}$. While the intermediate output buffer 130 obtains the complete intermediate output components $z_{v,k}$ in at least one of the corresponding specified row of the intermediate output matrix Z, the intermediate output components $z_{v,k}$ in the row are outputted to the second processing unit 140 to obtain the complete data in at least one of the corresponding specified column of the output matrix Y. The second processing unit 140 is used for receiving the intermediate output components $z_{v,k}$ buffered in the intermediate output buffer 130 and calculating the data $y_{h,v}$ in at least one of the specified column via the second IDCT procedure. Wherein the operation process of the first processing unit 120 corresponds to part A of FIG. 6, the operation process of the second processing unit 140 corresponds to part B of FIG. 6.

Figure 7:
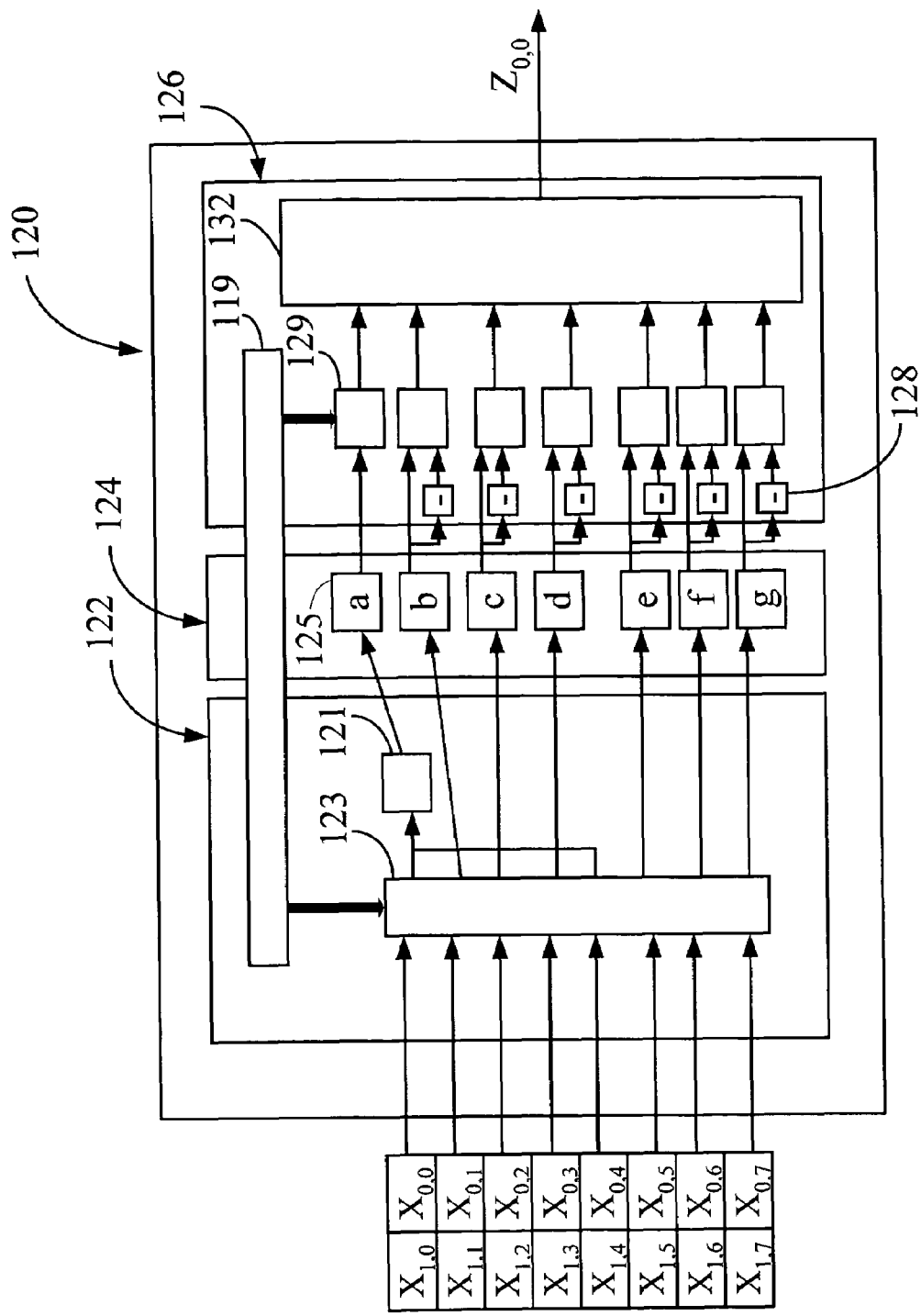
FIG. 7 is a schematic diagram of the circuit structure of the first processing unit shown in FIG. 1.

Please refer to FIG. 7. FIG. 7 is a schematic diagram of the circuit structure of the first processing unit 120 shown in FIG. 1. The first processing unit 120 comprises a first permutation circuit 122, a first multiplication circuit 124, a first summation circuit 126, and a first processing unit controller 119.

The first permutation circuit 122 is used for permuting the input discrete cosine transform coefficients $x_{k,l}$ and then outputting the corresponding discrete cosine transform coefficients $x_{k,l}$ according to the first IDCT procedure. The first permutation circuit 122 comprises an adder/subtractor 121 and one multiplexer 123.

The first multiplication circuit 124 comprises seven multipliers (a, b, c, d, e, f, and g). Each multiplier performs the multiplication operation with a transform coefficient. The first multiplication circuit 124 is used for multiplying the discrete cosine transform coefficients, which are permuted and outputted by the first permutation circuit 122, with the predetermined transform coefficients respectively and obtaining a plurality of corresponding multiplication results.

The transform coefficients are determined by the matrix $C_1^t$. The matrix $C_1^t$ has seven coefficients as follows:

$$\frac{1}{2}\cos\left(\frac{1}{16}\pi\right), \frac{1}{2}\cos\left(\frac{2}{16}\pi\right), \frac{1}{2}\cos\left(\frac{3}{16}\pi\right),$$

$$\frac{1}{2}\cos\left(\frac{4}{16}\pi\right), \frac{1}{2}\cos\left(\frac{5}{16}\pi\right), \frac{1}{2}\cos\left(\frac{6}{16}\pi\right), \frac{1}{2}\cos\left(\frac{7}{16}\pi\right).$$

It is represented in code as the following:

$$\begin{bmatrix} a \\ b \\ c \\ d \\ e \\ f \\ g \end{bmatrix} = \frac{1}{2} \begin{bmatrix} \cos\frac{4\pi}{16} \\ \cos\frac{\pi}{16} \\ \cos\frac{2\pi}{16} \\ \cos\frac{3\pi}{16} \\ \cos\frac{5\pi}{16} \\ \cos\frac{6\pi}{16} \\ \cos\frac{7\pi}{16} \end{bmatrix}.$$

The first summation circuit 126 is used for summing up the multiplication results obtained by the first multiplication circuit 124 according to the first IDCT procedure to obtain the intermediate output components $z_{v,k}$ in at least one specified row of the intermediate output matrix Z. The first summation circuit 126 comprises a plurality of invertors 128, a plurality of multiplexers 129, and an adder 132.

The first processing unit controller 119 is used for controlling the first permutation circuit 122, the first multiplication circuit 124, and the first summation circuit 126 according to the first IDCT procedure. The first processing unit controller 119 controls the invertors 128, the multiplexers 129, and the adder 132 to obtain the intermediate output components $z_{v,k}$ of the intermediate output matrix Z./

The preferred embodiment of FIG. 6 is taken as an example to describe the data operation of the first processing unit 120. The first permutation circuit 122 sequentially permutes $x_{k,l}$= [$x_{0,0}$, $x_{0,1}$, $x_{0,3}$, $x_{0,4}$, $x_{0,5}$, $x_{0,6}$, $x_{0,7}$] of the $0^{th}$ row from the input matrix X. According to the first IDCT procedure, the transform coefficients corresponding to $x_{k,l}$ of the $0^{th}$ row are [a b c d a e f g] of the $0^{th}$ row in $C_1^t$. The first processing unit controller 119 controls the multiplexer 123 to output $x_{k,l}$ to the corresponding multiplier 125 respectively. Wherein, because $x_{0,0}$ and $x_{0,4}$ are both corresponding to the multiplier 125a, the adder 121 first adds up $x_{0,0}$ and $x_{0,4}$ and outputs the sum to the multiplier 125. After multiplying $x_{k,l}$ by the transform coefficients, the first processing unit controller 119 controls the multiplexer 129 to select positive products from the multipliers, and the adder 132 adds up all the outputs of the multiplexer 129 to obtain the corresponding intermediate output component $z_{0,0}$ and outputs the outcome to the intermediate output buffer 130 to be buffered.

In a similar way, $x_{k,l}$ (k=1, l=0~7) of the $1^{st}$ row to $x_{k,l}$ (k=7, l=0~7) of the $7^{th}$ row are sequentially inputted to the first processing unit 120 and processed. Since some of the transform coefficients in $C_1^t$ are negative, the first processing unit controller 119 controls accordingly the multiplexer 129 to let the products from the multiplier 125 to pass through the invertors 128 and selects the negative product as multiplexer 129 output, and finally summed up by the adder 132. Therefore, all the intermediate output components $z_{v,k}$ (v=0, k=0~7) in the $0^{th}$ row of the intermediate output matrix Z can be obtained.

Please refer to FIG. 1. The second processing unit 140 comprises a second permutation circuit 142, a second multiplication circuit 144, a second summation circuit 146, and a second processing unit controller 149. The second IDCT procedure transforms the intermediate output matrix Z into the output matrix Y in the following matrix form: $Y=C_1^t Z^t$. The first and the second IDCT procedure transform the discrete cosine transform coefficients $x_{k,l}$ and the intermediate output components $z_{v,k}$ by the transform coefficients of the transpose matrix $C_1^t$, respectively. Therefore, the first and the second IDCT procedure have the same matrix equation. The only difference is that the input to both circuits is different, so that the output is also different. Therefore, the functions of the second permutation circuit 142, the second multiplication circuit 144, and the second summation circuit 146 of the second processing unit 140 are the same as the circuits of the first processing unit 120. The practical circuit structure is not described in detail here.

The preferred embodiment of FIG. 6 is taken as an example to describe the data operation of the second processing unit 140. The second permutation circuit 142 sequentially permutes $z_{v,k}=[z_{0,0}, z_{0,1}, z_{0,2}, z_{0,3}, z_{0,4}, z_{0,5}, z_{0,6}, z_{0,7}]$ of the $0^{th}$ row from the intermediate output buffer 130. According to the second IDCT procedure, the transform coefficients corresponding to $z_{v,k}$ of the $0^{th}$ row are [a b c d a e f g] of the $0^{th}$ row in $C_1^t$. The second processing unit controller 149 controls the multiplexer of the second permutation circuit 142 to output $z_{v,k}$ to the corresponding multiplier respectively. Wherein, because $z_{0,0}$ and $z_{0,4}$ are both corresponding to the transform coefficient a, $z_{0,0}$ and $z_{0,4}$ are added up first and then are output to the multiplier of the transform coefficient a. After $z_{v,k}$ of the $0^{th}$ row passes through the multipliers, the multiplexer outcomes are added up to obtain the corresponding data $y_{0,0}$. When $z_{v,k}$ of the $0^{th}$ row completely passes through the operation circuit of part B of FIG. 6 by repeating the above process 8 times, each data $y_{h,v}$ (h=0~7, v=0) in the $0^{th}$ column of the output matrix Y is obtained respectively.

According to another preferred embodiment of the present invention, the first and the second IDCT procedures are further simplified. The method of the first IDCT procedure for generating the intermediate output components $z_{v,k}$ is taken as an example in the following explanation.

The operation process of generating the intermediate output components $z_{v,k}$ should be further simplified because of the characteristic of the IDCT procedure. For 8-8 IDCT, the inputting of the $x_{k,l}$ (k=0, l=0~7) of the $0^{th}$ row is used for illustration. According to $C_1^t$, the intermediate output components $z_{0,0}$ and $z_{7,0}$ are equal to the following equations respectively:

$$z_{0,0}=x_{0,0}*a+x_{0,1}*b+x_{0,2}*c+x_{0,3}*d+x_{0,4}*a+x_{0,5}*e+x_{0,6}*f+x_{0,7}*g$$

$$z_{7,0}=x_{0,0}*a+x_{0,1}*(-b)+x_{0,2}*c+x_{0,3}*(-d)+x_{0,4}*a+x_{0,5}*(-e)+x_{0,6}*f+x_{0,7}*(-g)$$

The above two equations may be rewritten as the following equations:

$$z_{0,0}=[(x_{0,0}+x_{0,4})*a+x_{0,2}*c+x_{0,6}*f]+[x_{0,1}*b+x_{0,3}*d+x_{0,5}*e+x_{0,7}*g]$$

$$z_{7,0}=[(x_{0,0}+x_{0,4})*a+x_{0,2}*c+x_{0,6}*f]-[x_{0,1}*b+x_{0,3}*d+x_{0,5}*e+x_{0,7}*g]$$

If $[(x_{0,0}+x_{0,4})*a+x_{0,2}*c+x_{0,6}*f]$ and $[x_{0,1}*b+x_{0,3}*d+x_{0,5}*e+x_{0,7}*g]$ are calculated separately, and the two resulting values are added or subtracted with each other by an adder/subtractor, two intermediate output components $z_{0,0}$ and $z_{7,0}$ can be obtained by one operation.

In the same way, all the values of $[z_{1,0}\ z_{6,0}]$, $[z_{2,0}\ z_{5,0}]$, and $[z_{3,0}\ z_{4,0}]$ can be obtained respectively by one operation. Therefore, the operation of the first IDCT procedure can be reduced in half.

According to the above simplified process, the matrix $C_1^t$ of the first and the second IDCT procedures can be further simplified as $C_1^t = P_1 A_{88} P_2$. Wherein, the matrix $P_1$, the matrix $A_{88}$, and the matrix $P_2$, are represented as follows:

$$A_{88} = \begin{bmatrix} A_1 & A_2 \\ A_1 & -A_2 \end{bmatrix}, \text{ wherein}$$

$$A_1 = \frac{1}{2}\begin{bmatrix} \cos(\frac{4}{16}\pi) & \cos(\frac{2}{16}\pi) & \cos(\frac{4}{16}\pi) & \cos(\frac{6}{16}\pi) \\ \cos(\frac{4}{16}\pi) & \cos(\frac{6}{16}\pi) & -\cos(\frac{4}{16}\pi) & -\cos(\frac{2}{16}\pi) \\ \cos(\frac{4}{16}\pi) & -\cos(\frac{6}{16}\pi) & -\cos(\frac{4}{16}\pi) & \cos(\frac{2}{16}\pi) \\ \cos(\frac{4}{16}\pi) & -\cos(\frac{4}{16}\pi) & \cos(\frac{4}{16}\pi) & -\cos(\frac{6}{16}\pi) \end{bmatrix},$$

$$A_2 = \frac{1}{2}\begin{bmatrix} \cos(\frac{1}{16}\pi) & \cos(\frac{3}{16}\pi) & \cos(\frac{5}{16}\pi) & \cos(\frac{7}{16}\pi) \\ \cos(\frac{3}{16}\pi) & -\cos(\frac{7}{16}\pi) & -\cos(\frac{1}{16}\pi) & -\cos(\frac{5}{16}\pi) \\ \cos(\frac{5}{16}\pi) & -\cos(\frac{1}{16}\pi) & \cos(\frac{7}{16}\pi) & \cos(\frac{3}{16}\pi) \\ \cos(\frac{7}{16}\pi) & -\cos(\frac{5}{16}\pi) & \cos(\frac{3}{16}\pi) & -\cos(\frac{1}{16}\pi) \end{bmatrix};$$

$$P_1 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \end{bmatrix},$$

$$P_2 = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}.$$

The matrixes $A_1$ and $A_2$ can be rewritten as the following by the transform coefficients of the multiplier 125:

$$A_1 = \begin{bmatrix} a & c & a & f \\ a & f & -a & -c \\ a & -f & -a & c \\ a & -c & -a & -f \end{bmatrix}, A_2 = \begin{bmatrix} b & d & e & g \\ d & g & -b & -e \\ e & -b & g & d \\ g & -e & d & -b \end{bmatrix}.$$

Because the matrix $C_1^t$ is simplified, the first processing unit 110 and the second processing unit 140 of the BOU 110 of the present invention can be simplified accordingly.

Figure 8:
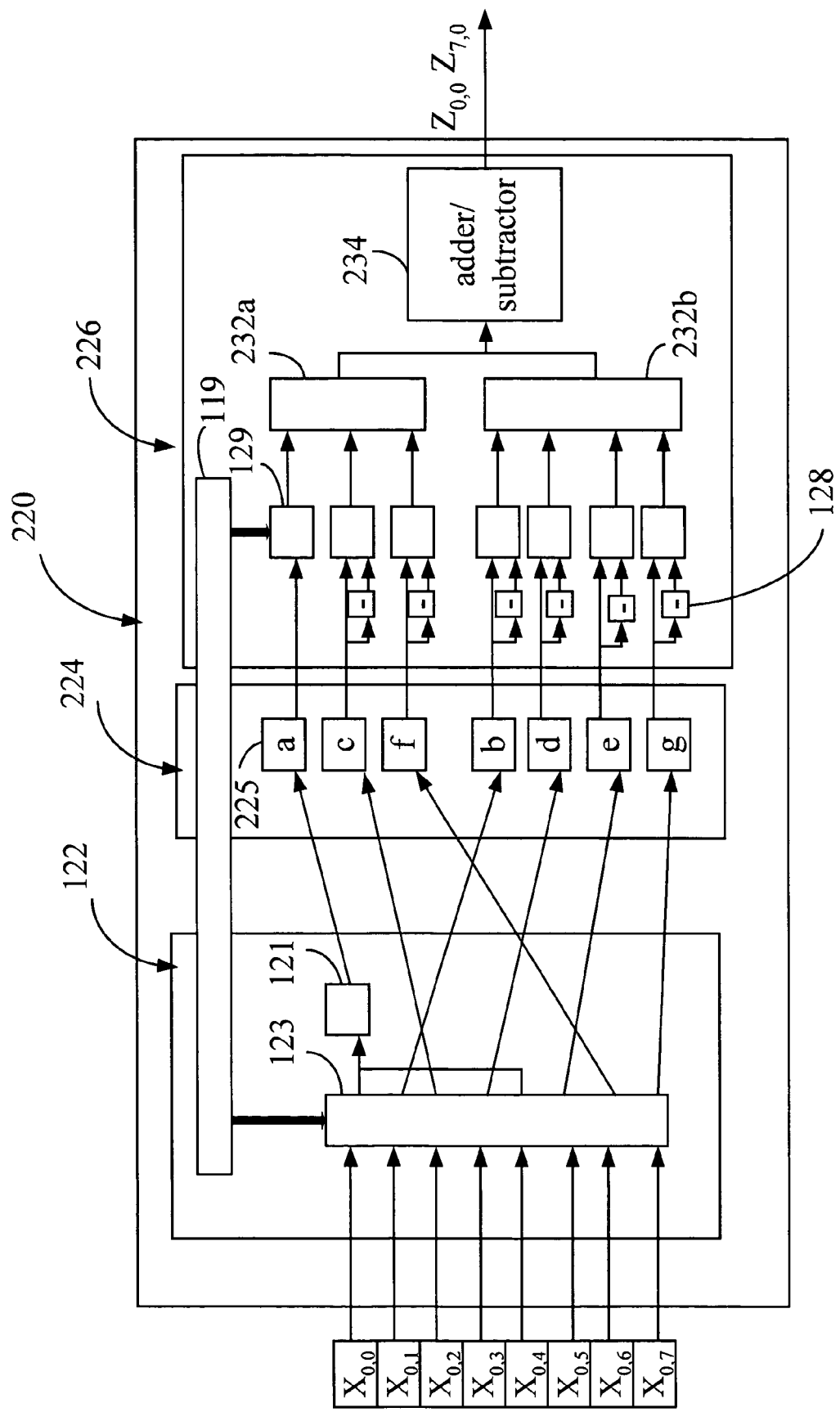
FIG. 8 is a schematic diagram of data operation of the first processing unit of another preferred embodiment according to the present invention.

Please refer to FIG. 8. FIG. 8 is a schematic diagram of the data operation of the first processing unit 220 of another preferred embodiment according to the present invention.

According to $C_1^t = P_1 A_{88} P_2$, the multiplier 225 of the first multiplication circuit 224 is divided into two groups, which are 225a, 225c, 225f and 225b, 225d, 225e, 225g.

Furthermore, the inputted $x_{k,l}$ (k=0, l=0~7) of the $0^{th}$ row is taken as an example. According to the first IDCT procedure, the first processing unit controller 119 controls the multiplexer 123 to output $x_{k,l}$ to the corresponding multiplier 225 respectively. After $x_{k,l}$ passes through the multiplier 225, the first processing unit controller 119 controls the multiplexer 129 to let the products of $x_{0,0}$, $x_{0,2}$, $x_{0,4}$, $x_{0,6}$ and its corresponding transform coefficients, sum up by the adder 232a to obtain $[(x_{0,0}+x_{0,4})*a+x_{0,2}*c+x_{0,6}*f]$. Moreover, the adder 232b adds up the products of $x_{0,1}$, $x_{0,3}$, $x_{0,5}$, $x_{0,7}$ and its corresponding transform coefficients, to obtain $[x_{0,1}*b+x_{0,3}*d+x_{0,5}*e+x_{0,7}*g]$. Finally, the adder/subtractor 234 adds the two values to obtain the intermediate output components $z_{0,0}$ and subtracts the two values to obtain the intermediate output components $z_{7,0}$. The intermediate output components $z_{0,0}$ and $z_{7,0}$ are outputted to the intermediate output buffer 130 to be buffered.

After the intermediate output buffer 130 obtains two complete rows of intermediate output components $z_{v,k}$ (v=0, k=0~7) and $z_{v,k}$ (v=7, k=0~7), the two rows are outputted to the second processing unit 140 in sequence. Because the 8-8 IDCT transforms the intermediate output matrix Z into the output matrix Y in the following matrix form: $Y = C_1^t Z^t$, the circuit operation of the second processing unit 140 is the same as the first processing unit 120. The second processing unit 140 sequentially receives $z_{v,k}$ (v=0, k=0~7) and $z_{v,k}$ (v=7, k=0~7) and performs calculation respectively. Each time one row of $z_{v,k}$ is received, the second processing unit 140 of the present embodiment can obtain the data $y_{h,v}$ in two columns of the output matrix Y according to the above simplified method.

Figure 9:
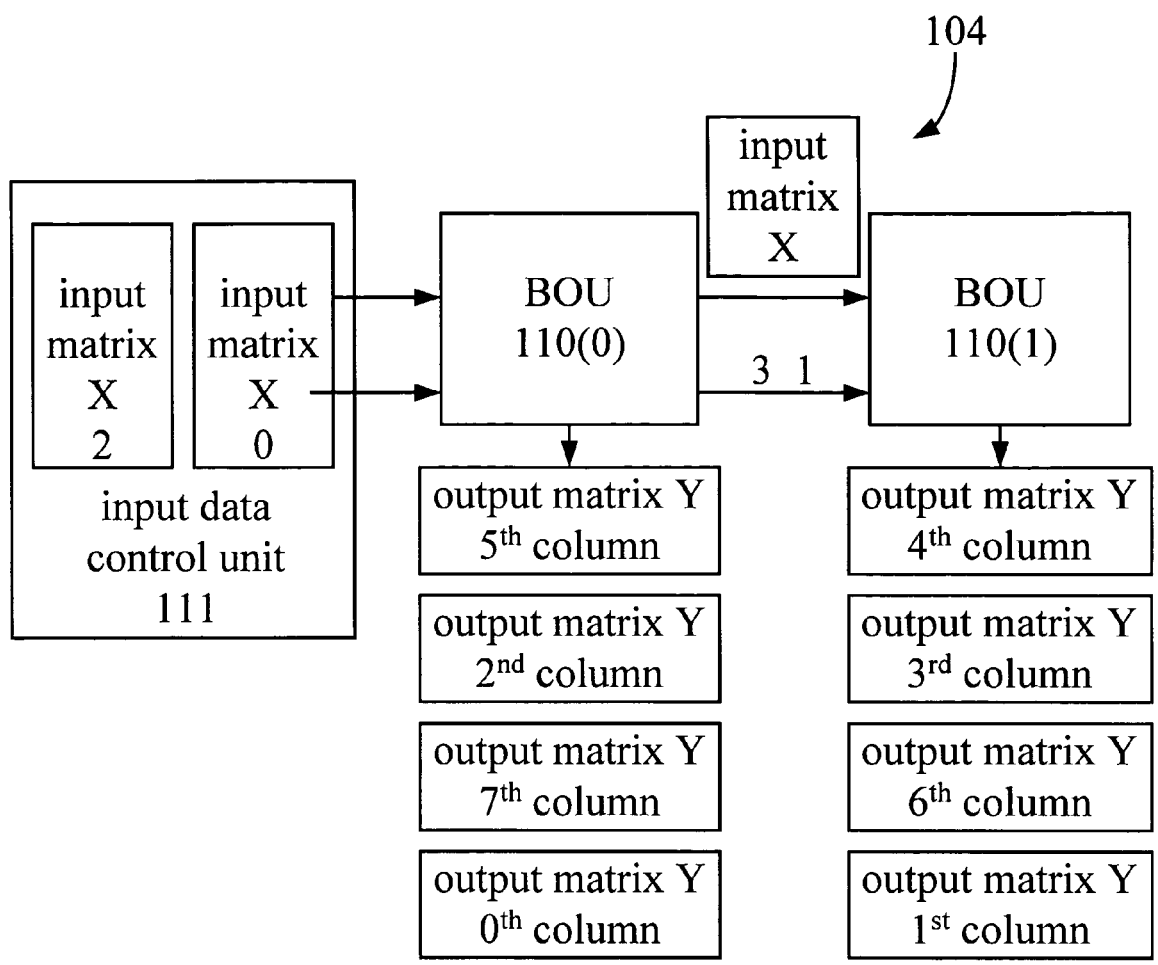
FIG. 9 is a schematic diagram of the relationship between the transform control signals of the data processing system of the first processing unit and the decoded output matrix Y shown in FIG. 8.

Please refer to FIG. 9. FIG. 9 is a schematic diagram of the relationship between the transform control signals of the data processing system 104 with the first processing unit 220 as shown in FIG. 8 and the decoded output matrix Y. The data processing system 104 integrates the embodiments in FIG. 4 and FIG. 8 to further improve the IDCT procedure. The data processing system 104 comprises two BOUs 110(0) and 110(1). Whenever each BOU 220 receives one input matrix X, the BOUs 220 can generate the data in two specified columns of the output matrix Y, respectively.

As shown in FIG. 9, Each time the BOU 110(0) receives one input matrix X, the BOU 110(0) determines the two specified columns of the output matrix Y to be obtained by transforming the input matrix X according to corresponding transform control signals. The BOU 110(0) transforms the input matrix X into data in two specified columns of the output matrix Y via the IDCT procedure. According to the method of the present invention, after receiving the input matrix X, the input data control unit 111 needs to re-output the input matrix X two times to the BOU 110(0). The input data control unit 111 further generates and outputs the transform control signals corresponding to each input matrix X to the BOU 110(0). Each time the BOU 110(0) receiving one input matrix X, it further transmits the data to the BOU 110(1) and generates the new transform control signal to the BOU 110(1) at the same time. Then, the BOUs 110(0) and 110(1) decode each of the received input matrix X according to the corresponding transform control signal and obtain the data in two specified columns of the output matrix Y.

For example, if the transform control signal accompanying the first input matrix X received by the BOU 110(0) is 0, it represents that the $0^{th}$ and $7^{th}$ column of the output matrix Y should be obtained after the input matrix X is transformed. The BOU 110(0) adds one to the received transform control signal to obtain a new transform control signal with a value of 1 and transmits the new transform control signal to the BOU 110(1). Therefore, the BOUs 110(0) and 110(1) can operate and obtain two columns of the output matrix Y at the same time.

The BOU 110(0) transforms the input matrix X into the data in the $0^{th}$ and $7^{th}$ columns of the output matrix Y via the IDCT procedure. Therefore, after the BOU 110(0) receives the second input matrix X, the BOU 110(0) sequentially generates the data in the $0^{th}$, $7^{th}$ and $2^{nd}$, $5^{th}$ columns of the output matrix Y according to the corresponding transform control signals 0, 2 generated by the input data control unit. On the other hand, the BOU 110(1) receives twice the input matrix X and the corresponding transform control signal 1, 3 which are transmitted from the BOU 110(0) and sequentially generates the other data in the $1^{st}$, $6^{th}$ and $3^{rd}$, $4^{th}$ columns of the output matrix Y, the complete output matrix Y can be obtained. Therefore, the processing time of the IDCT procedure of the data processing system according to the present invention can be greatly further reduced.

The present invention provides an input data control method and system thereof for performing the IDCT procedure. The input data control method involves first generating a transform control signal and outputting the transform control signal together with the input matrix to at least one of the BOUs. By the transform control signal update procedure, a new transform control signal is generated according to the received transform control signal received by the corresponding BOU, and outputted together with the input matrix X to the other following BOUs. The step of generating new transform control signals is repeated until each specified column of the output matrix Y is decoded by a corresponding BOU. Finally, a basic operation procedure is performed, and the received input matrix is decoded according to the received transform control signal to obtain the data in the specified columns corresponding to the transform control signal.

By the method of the present invention, the present invention can solve the drawback that the data processing system of the prior art is not scalable. The present invention can increase and integrate a plurality of BOUs, without redesigning the hardware, according to different requirements according to the different throughput rate requirement of the IDCT procedure in different systems. The present invention enables a plurality of BOUs to perform operations of the IDCT procedure at the same time, so as to shorten the needed time of calculation. The present invention can solve the problem in the prior art that the second IDCT procedure is idle to wait the results of the first IDCT procedure. The present invention can reduce the capacity of the buffer memory of the prior art and the cost of production. Furthermore, the present invention can further reduce the operation time and the needed hardware circuit by sharing operation procedures, so as to greatly reduce the image processing time and the cost of device.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An inverse discrete cosine transform (IDCT) apparatus in a video codec for transforming one input matrix X having a plurality of image related discrete cosine transform (DCT)

coefficients into image data in a plurality of specified columns in an output matrix Y via an IDCT procedure, the IDCT apparatus comprising:

at least one input data control unit, each of the input data control units being used for outputting the input matrix X to at least one of the other input data control units, and for further generating at least one transform control signal together with each outputting of the input matrix X, the transform control signal indicating the decoded at least one specified column in the output matrix Y after the input matrix X is transformed via the IDCT procedure, wherein while receiving the transform control signal from another input data control unit, each of the input data control units generates a corresponding new transform control signal according to the received transform control signal; and at least one basic operation unit (BOU), each of the BOUs comprising processing circuitry for receiving the input matrix X and the transform control signal outputted from one of the input data control units, and for decoding the received input matrix X according to the transform control signal and obtaining the image data in said at least one specified column in the output matrix Y.

2. The IDCT apparatus of claim 1, wherein the input data control unit is integrated in one of the BOUs.

3. The IDCT apparatus of claim 2, wherein the BOUs are cascaded with each other.

4. The IDCT apparatus of claim 3, wherein each of the BOUs is capable of connecting to more than one of the other BOUs at the same time.

5. The IDCT apparatus of claim 1, wherein the IDCT procedure comprises a first IDCT procedure and a second IDCT procedure.

6. The IDCT apparatus of claim 5, wherein the IDCT procedure is an 8-8 IDCT procedure, and the input matrix has 8 rows and 8 columns of discrete cosine transform coefficients $x_{k,l}$, and wherein the first IDCT procedure transforms the discrete cosine transform coefficients $x_{k,l}$ into a plurality of intermediate output components $z_{v,k}$ of an intermediate output matrix, and the equation of the first IDCT procedure is:

$$z_{v,k} = \sum_{l=0}^{7} c(l) * x_{k,l} * \cos\left(\frac{(2v+1)}{16} * l * \pi\right),$$

wherein $c(0) = \frac{1}{2\sqrt{2}}$, $c(n) = 1/2$, c(n)=½, n is integer and n=1~7; v, k, l are integer and v=0~7 k=0~7, l=0~7;

and wherein the second IDCT procedure transforms the intermediate output components into the output matrix having 8 rows and 8 columns of image data Yh,v, and the equation of the second IDCT procedure is:

$$y_{h,v} = \sum_{k=0}^{7} c(k) * z_{v,k} * \cos\left(\frac{(2h+1)}{16} * k * \pi\right), \text{ wherein } c(0) = \frac{1}{2\sqrt{2}},$$

c(n)=½, n is integer and n=1~7; v, k, l are integer and v=0~7, k=0~7, l=0~7.

7. The IDCT apparatus of claim 6, wherein the first IDCT procedure transforms the input matrix X into the intermediate output matrix Z in the following matrix form: $Z=C_1{}^t X^t$, the second IDCT procedure transforms the intermediate output matrix Z into the output matrix Y in the following matrix form: $Y=C_1{}^t Z^t$, wherein $X^t$ represents the transpose matrix of the input matrix X, $Z^t$ represents the transpose matrix of the intermediate output matrix Z, $C_1{}^t$ represents the transpose matrix of a transform matrix $C_1$, and $C_1{}^t$ is represented as:

$$C_1^t = \begin{bmatrix} a & b & c & d & a & e & f & g \\ a & d & f & -g & -a & -b & -c & -e \\ a & e & -f & -b & -a & g & c & d \\ a & g & -c & -e & a & d & -f & -b \\ a & -g & -c & e & a & -d & -f & b \\ a & -e & -f & b & -a & -g & c & -d \\ a & -d & f & g & -a & b & -c & e \\ a & -b & c & -d & a & -e & f & -g \end{bmatrix}, \text{ wherein}$$

$$\begin{bmatrix} a \\ b \\ c \\ d \\ e \\ f \\ g \end{bmatrix} = \frac{1}{2} \begin{bmatrix} \cos\frac{4\pi}{16} \\ \cos\frac{\pi}{16} \\ \cos\frac{2\pi}{16} \\ \cos\frac{3\pi}{16} \\ \cos\frac{5\pi}{16} \\ \cos\frac{6\pi}{16} \\ \cos\frac{7\pi}{16} \end{bmatrix}.$$

8. The IDCT apparatus of claim 7, wherein $C_1{}^t$ is further expressed as $C_1{}^t = P_1 A_{88} P_2$, and $$A_{88} = \begin{bmatrix} A_1 & A_2 \\ A_1 & -A_2 \end{bmatrix},$$

$$A_1 = \frac{1}{2} \begin{bmatrix} \cos\left(\frac{4}{16}\pi\right) & \cos\left(\frac{2}{16}\pi\right) & \cos\left(\frac{4}{16}\pi\right) & \cos\left(\frac{6}{16}\pi\right) \\ \cos\left(\frac{4}{16}\pi\right) & \cos\left(\frac{6}{16}\pi\right) & -\cos\left(\frac{4}{16}\pi\right) & -\cos\left(\frac{2}{16}\pi\right) \\ \cos\left(\frac{4}{16}\pi\right) & -\cos\left(\frac{6}{16}\pi\right) & -\cos\left(\frac{4}{16}\pi\right) & \cos\left(\frac{2}{16}\pi\right) \\ \cos\left(\frac{4}{16}\pi\right) & -\cos\left(\frac{4}{16}\pi\right) & \cos\left(\frac{4}{16}\pi\right) & -\cos\left(\frac{6}{16}\pi\right) \end{bmatrix},$$

$$A_2 = \frac{1}{2} \begin{bmatrix} \cos\left(\frac{1}{16}\pi\right) & \cos\left(\frac{3}{16}\pi\right) & \cos\left(\frac{5}{16}\pi\right) & \cos\left(\frac{7}{16}\pi\right) \\ \cos\left(\frac{3}{16}\pi\right) & -\cos\left(\frac{7}{16}\pi\right) & -\cos\left(\frac{1}{16}\pi\right) & -\cos\left(\frac{5}{16}\pi\right) \\ \cos\left(\frac{5}{16}\pi\right) & -\cos\left(\frac{1}{16}\pi\right) & \cos\left(\frac{7}{16}\pi\right) & \cos\left(\frac{3}{16}\pi\right) \\ \cos\left(\frac{7}{16}\pi\right) & -\cos\left(\frac{5}{16}\pi\right) & \cos\left(\frac{3}{16}\pi\right) & -\cos\left(\frac{1}{16}\pi\right) \end{bmatrix},$$

$$P_1 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \end{bmatrix},$$

-continued $$P_2 = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}.$$

9. The IDCT apparatus of claim 8, wherein each of the BOUs further comprises:
a first processing unit for calculating the discrete cosine transform coefficients $x_{k,l}$ in each row of the input matrix via the first IDCT procedure, and sequentially obtaining the intermediate output components $z_{v,k}$ in said at least one specified row of the intermediate output matrix Z;
an intermediate output buffer for buffering the intermediate output components $z_{v,k}$ in said at least one specified row; and
a second processing unit for receiving the intermediate output components $z_{v,k}$ buffered in the intermediate output buffer and calculating the image data $y_{h,v}$ in said at least one specified column via the second IDCT procedure.

10. The IDCT apparatus of claim 9, wherein the first processing unit calculates the discrete cosine transform coefficients $x_{k,l}$ in each row of the input matrix via the first IDCT procedure and outputs the outcome to the intermediate output buffer to be buffered, and while the complete intermediate output components in the corresponding at least one specified row of the intermediate output matrix are obtained, the complete intermediate output components are outputted to the second processing unit to obtain the complete image data in the corresponding at least one specified column of the output matrix Y.

11. The IDCT apparatus of claim 10, wherein the first processing unit comprises:
a first permutation circuit for permuting the input discrete cosine transform coefficients $x_{k,l}$ and then outputting the corresponding discrete cosine transform coefficients $x_{k,l}$ according to the first IDCT procedure;
a first multiplication circuit for multiplying the discrete cosine transform coefficients permuted and outputted by the first permutation circuit with a plurality of predetermined transform coefficients respectively and obtaining a plurality of corresponding multiplication products;
a first summation circuit for summing up the multiplication products obtained by the first multiplication circuit according to the first IDCT procedure, and obtaining the intermediate output components $z_{v,k}$ in said at least one specified row of the intermediate output matrix; and
a first processing unit controller for controlling the first permutation circuit, the first multiplication circuit, and the first summation circuit.

12. The IDCT apparatus of claim 11, wherein the first multiplication circuit comprises seven multipliers, and each multiplier performs multiplication operations on one of the seven transform coefficients listed in the following:

$$\frac{1}{2}\cos\left(\frac{1}{16}\pi\right), \frac{1}{2}\cos\left(\frac{2}{16}\pi\right), \frac{1}{2}\cos\left(\frac{3}{16}\pi\right), \frac{1}{2}\cos\left(\frac{4}{16}\pi\right),$$
$$\frac{1}{2}\cos\left(\frac{5}{16}\pi\right), \frac{1}{2}\cos\left(\frac{6}{16}\pi\right), \text{ and } \frac{1}{2}\cos\left(\frac{7}{16}\pi\right).$$

13. The IDCT apparatus of claim 11, wherein the first permutation circuit comprises an adder/subtractor and at least one multiplexer, and the first processing unit controller controls the adder/subtractor and the multiplexers according to the first IDCT procedure, so that the discrete cosine transform coefficients are calculated, permuted and then outputted to the corresponding multiplier.

14. The IDCT apparatus of claim 11, wherein the first summation circuit comprises a plurality of invertors, a plurality of multiplexers, two adders, and an adder/subtractor, and the first processing unit controller controls the invertors, the multiplexers, and the adder/subtractor to obtain the intermediate output components of the intermediate output matrix Z according to the first IDCT procedure.

15. The IDCT apparatus of claim 10, wherein the second processing unit comprises:
a second permutation circuit for permuting and outputting the intermediate output components $z_{v,k}$ buffered in the intermediate output buffer according to the second IDCT procedure;
a second multiplication circuit for multiplying the intermediate output components permuted and outputted by the second permutation circuit with a plurality of predetermined transform coefficients respectively and obtaining a plurality of corresponding multiplication products;
a second summation circuit for summing up the multiplication products obtained by the second multiplication circuit according to the second IDCT procedure, and obtaining the image data in said at least one specified column of the output matrix Y; and
a second processing unit controller for controlling the second permutation circuit, the second multiplication circuit, and the second summation circuit.

16. The IDCT apparatus of claim 15, wherein the second multiplication circuit comprises seven multipliers, and each multiplier performs multiplication operations on one of the seven transform coefficients listed in the following:

$$\frac{1}{2}\cos\left(\frac{1}{16}\pi\right), \frac{1}{2}\cos\left(\frac{2}{16}\pi\right), \frac{1}{2}\cos\left(\frac{3}{16}\pi\right), \frac{1}{2}\cos\left(\frac{4}{16}\pi\right),$$
$$\frac{1}{2}\cos\left(\frac{5}{16}\pi\right), \frac{1}{2}\cos\left(\frac{6}{16}\pi\right), \text{ and } \frac{1}{2}\cos\left(\frac{7}{16}\pi\right).$$

17. The IDCT apparatus of claim 15, wherein the second permutation circuit comprises an adder/subtractor and a plurality of multiplexers, and the second processing unit controller controls the adder/subtractor and the multiplexers according to the second IDCT procedure, so that the discrete cosine transform coefficients are calculated, permuted and outputted to the corresponding multiplier.

18. The IDCT apparatus of claim 15, wherein the second summation circuit comprises a plurality of invertors, a plurality of multiplexers, two adders, and an adder/subtractor, and the second processing unit controller controls the multiplexers and the adder/subtractor to obtain the image data $y_{h,v}$ of the specified column according to the second IDCT procedure.

19. An inverse discrete cosine transform (IDCT) apparatus in a video codec for transforming one input matrix X having a plurality of image related discrete cosine transform (DCT) coefficients into image data in a plurality of specified columns in an output matrix Y via an IDCT procedure, the IDCT apparatus comprising:
an input data control unit for outputting the input matrix X, and for further generating at least one transform control signal together with each outputting of the input matrix X, the at least one transform control signal indicating the at least one specified decoded column in the output matrix Y respectively after the input matrix X is transformed via the IDCT procedure; and at least one basic operation unit (BOU), each of the BOUs being cascaded with each other, one of the BOUs comprising processing circuitry for receiving the input matrix X and the transform control signal outputted from the input data control unit, and outputting at least one new transform control signal generated from the received transform control signal, together with the input matrix to the following BOU; the other BOUs comprising processing circuitry for receiving the input matrix X and the transform control signal outputted from one BOU, and outputting at least one new transform control signal generated from the received transform control signal, together with the input matrix to the following BOU; each of the BOUs decoding the received input matrix X according to the received transform control signal and obtaining the image data in said at least one specified column in the output matrix Y.

20. The IDCT apparatus of claim 19, wherein the BOUs are cascaded with each other.

21. The IDCT apparatus of claim 20, wherein each of the BOUs is capable of connecting to more than one of the other BOUs at the same time.

22. A computer program product stored on a computer-readable medium, the computer-readable medium having an embedded computer program for an inverse discrete cosine transform (IDCT) apparatus in a video codec the IDCT apparatus comprising at least one basic operation unit (BOU), each of the BOUs being cascaded with each other, the IDCT apparatus being used for transforming one input matrix X having a plurality of discrete cosine transform (DCT) coefficients into image data in a plurality of specified columns in an output matrix Y via an IDCT procedure, when being executed by the video codec, the computer program making the video codec perform the following steps of:

(a) generating a transform control signal, outputting the transform control signal together with the input matrix to at least one of the BOUs, the transform control signal indicating the decoded at least one first specified column in the output matrix Y after the input matrix X is transformed via the IDCT procedure;

(b) performing a transform control signal update procedure, outputting a new transform control signal generated according to the received transform control signal, together with the input matrix X, to the other following BOU, the new transform control signal indicating the decoded at least one second specified column in the output matrix Y after the input matrix X is transformed via the IDCT procedure, the second specified column being different from the first specified column;

(c) repeating step (b) until each column of the output matrix Y is decoded by a corresponding BOU; and (d) performing a basic operation procedure, decoding the received input matrix according to the received transform control signal to obtain the image data in the specified columns corresponding to the transform control signal.

23. The computer program product of claim 22, wherein the transform control signal is the first column number of said at least one specified column in the output matrix Y after the input matrix X is transformed and decoded via the IDCT procedure.

24. The computer program product of claim 23, wherein the transform control signal update procedure is as follows: after receiving the transform control signal, the BOUs add one to the first column number of the at least one specified column to obtain the new transform control signal.

25. The computer program product of claim 22, wherein the IDCT procedure comprises a first IDCT procedure and a second IDCT procedure.

26. The computer program product of claim 25, wherein the IDCT procedure is an 8-8 IDCT procedure, and the input matrix has 8 rows and 8 columns of discrete cosine transform coefficients $x_{k,l}$ and wherein the first IDCT procedure transforms the discrete cosine transform coefficients $x_{k,l}$ into a plurality of intermediate output components $z_{v,k}$ of an intermediate output matrix, and the equation of the first IDCT procedure is:

$$z_{v,k} = \sum_{l=0}^{7} c(l) * x_{k,l} * \cos\left(\frac{(2v+1)}{16} * l * \pi\right), \text{ wherein } c(0) = \frac{1}{2\sqrt{2}},$$

$c(n)=\frac{1}{2}$, n is integer and n=1~7; v, k, l are integer and v=0~7 k=0~7, l=0~7;

and wherein the second IDCT procedure transforms the intermediate output components into the output matrix having 8 rows and 8 columns of image data $y_{h,v}$, and the equation of the second IDCT procedure is:

$$y_{h,v} = \sum_{k=0}^{7} c(k) * z_{v,k} * \cos\left(\frac{(2h+1)}{16} * k * \pi\right), \text{ wherein } c(0) = \frac{1}{2\sqrt{2}},$$

$c(n)=\frac{1}{2}$, n is integer and n=1~7; v, k, l are integer and v=0~7 k=0~7, l=0~7.

27. The computer program product of claim 26, wherein the basic operation procedure comprises the following steps:
transforming the input matrix X via the first IDCT procedure to obtain the intermediate output components $z_{i,j}$ (i=0~7, j=0~7) in at least one specified row in the intermediate output matrix; and
transforming the intermediate output components $z_{i,j}$ in the at least one specified row via the second IDCT procedure to obtain the image data in at least one specified column in the output matrix.

28. A basic operation unit (BOU) for an inverse discrete cosine transform (IDCT) apparatus in a video codec, the IDCT apparatus being for transforming one input matrix X having a plurality of image related discrete cosine transform (DCT) coefficients into one intermediate output matrix having a plurality of intermediate output components first via a first IDCT procedure and transforming the intermediate output matrix into image data in one specified column in a output matrix via a second IDCT procedure, the BOU comprising:
a first processing unit comprising processing circuitry for sequentially obtaining the intermediate output components in one specified row of the intermediate output matrix Z based on the DCT coefficients in each row of the input matrix and the first IDCT procedure;
an intermediate output buffer comprising processing circuitry for buffering the intermediate output components in said one specified row of the intermediate output matrix Z; and
a second processing unit comprising processing circuitry for receiving the intermediate output components buffered in the intermediate output buffer and generating the image data in said one specified column in the output matrix via the second IDCT procedure;

wherein the first processing unit and the second processing unit both comprise seven multipliers, the seven multipliers perform multiplication operations on the seven transform coefficients listed in the following:

$$\frac{1}{2}\cos\left(\frac{1}{16}\pi\right), \frac{1}{2}\cos\left(\frac{2}{16}\pi\right), \frac{1}{2}\cos\left(\frac{3}{16}\pi\right), \frac{1}{2}\cos\left(\frac{4}{16}\pi\right),$$
$$\frac{1}{2}\cos\left(\frac{5}{16}\pi\right), \frac{1}{2}\cos\left(\frac{6}{16}\pi\right), \text{ and } \frac{1}{2}\cos\left(\frac{7}{16}\pi\right)$$

for being multiplied with the DCT coefficients and the intermediate input components respectively and obtaining the multiplication results; the first processing unit calculates the discrete cosine transform coefficients in each row of the input matrix via the first IDCT procedure and outputs the outcome to the intermediate output buffer to be buffered, and while the complete intermediate output components in the corresponding one specified row of the intermediate output matrix Z are obtained, the complete intermediate output components are outputted to the second processing unit to obtain the complete image data in the corresponding one specified column of the output matrix: the IDCT procedure is an 8-8 IDCT procedure, and the input matrix has 8 rows and 8 columns of discrete cosine transform coefficients $x_{k,l}$, and wherein the first IDCT procedure transforms the discrete cosine transform coefficients $x_{k,l}$ into a plurality of intermediate output components $z_{v,k}$, and the equation of the first IDCT procedure is:

$$z_{v,k} = \sum_{l=0}^{7} c(l) * x_{k,l} * \text{COS}\left(\frac{(2v+1)}{16} * l * \pi\right), \text{ wherein } c(0) = \frac{1}{2\sqrt{2}},$$

$c(n)=\frac{1}{2}$, n is integer and n=1~7; v, k, l are integer and v=0~7, k=0~7, l=0~7; and wherein the second IDCT procedure transforms the intermediate output components into the output matrix having 8 rows and 8 columns of image data $y_{h,v}$, and the equation of the second IDCT procedure is:

$$y_{h,v} = \sum_{k=0}^{7} c(k) * z_{v,k} * \text{COS}\left(\frac{(2h+1)}{16} * k * \pi\right), \text{ wherein } c(0) = \frac{1}{2\sqrt{2}},$$

$c(n)=\frac{1}{2}$, n is integer and n=1~7; v, k, l are integer and v=0~7, k=0~7, l=0~7; wherein the first processing unit further comprises the following components:

a first permutation circuit for permuting the input discrete cosine transform coefficients and then outputting the corresponding discrete cosine transform coefficients according to the first IDCT procedure;

a first multiplication circuit for multiplying the discrete cosine transform coefficients permuted and outputted by the first permutation circuit with the transform coefficients respectively and obtaining a plurality of corresponding multiplication products;

a first summation circuit for summing up the multiplication products obtained by the first multiplication circuit according to the first IDCT procedure, and obtaining the intermediate output components $z_{v,k}$ in said one specified row of the intermediate output matrix Z; and a first processing unit controller for controlling the first permutation circuit, the first multiplication circuit, and the first summation circuit;

wherein the first summation circuit comprises a plurality of invertors, a plurality of multiplexers, two adders, and an adder/subtractor, and the first processing unit controller controls the invertors, the multiplexers, and the adder/subtractor to obtain the intermediate output components of the intermediate output matrix Z according to the first IDCT procedure.

29. The BOU of claim 28, wherein the first permutation circuit comprises an adder/subtractor and a plurality of multiplexers, and the first processing unit controller controls the adder/subtractor and the multiplexers according to the first IDCT procedure, so that the discrete cosine transform coefficients are calculated, permuted and then outputted to the corresponding multiplier.

30. The BOU of claim 28, wherein the second processing unit further comprises:

a second permutation circuit for permuting and outputting the intermediate output components buffered in the intermediate output buffer according to the second IDCT procedure;

a second multiplication circuit for multiplying the intermediate output components permuted and outputted by the second permutation circuit with a plurality of predetermined transform coefficients respectively and obtaining a plurality of corresponding multiplication products;

a second summation circuit for summing up the multiplication products obtained by the second multiplication circuit according to the second IDCT procedure, and obtaining the image data in said one specified column of the output matrix Y; and a second processing unit controller for controlling the second permutation circuit, the second multiplication circuit, and the second summation circuit.

31. The BOU of claim 30, wherein the second permutation circuit comprises an adder/subtractor and a plurality of multiplexers, and the second processing unit controller controls the adder/subtractor and the multiplexers according to the second IDCT procedure, so that the discrete cosine transform coefficients are calculated, permuted and outputted to the corresponding multiplier.

32. The BOU of claim 31, wherein the second summation circuit comprises a plurality of invertors, a plurality of multiplexers, two adders, and an adder/subtractor, and the second processing unit controller controls the multiplexers and the adder/subtractor to obtain the image data of the specified column according to the second IDCT procedure.

33. The BOU of claim 28, wherein the basic operation unit further comprises a continuous control unit, each of the continuous control units being for outputting the input matrix X to at least one of the other BOU's continuous control unit, and for further generating at least one transform control signal together with each outputting of the input matrix X, the transform control signal indicating the decoded image data at least one specified column in the output matrix Y after the input matrix X is transformed via the IDCT procedure, wherein while receiving the transform control signal from another continuous control unit, each of the continuous control units generates a corresponding new transform control signal according to the received transform control signal.

34. A basic operation unit (BOU) for an inverse discrete cosine transform (IDCT) apparatus in a video codec, the IDCT apparatus being for transforming one input matrix X having a plurality of image related discrete cosine transform (DOT) coefficients into one intermediate output matrix having a plurality of intermediate output components first via a first IDCT procedure and transforming the intermediate output matrix into image data in one specified column in a output matrix via a second IDCT procedure, the BOU comprising:
- a first processing unit comprising processing circuitry for sequentially obtaining the intermediate output components in one specified row of the intermediate output matrix Z based on the DCT coefficients in each row of the input matrix and the first IDCT procedure;
- an intermediate output buffer comprising processing circuitry for buffering the intermediate output components in said one specified row of the intermediate output matrix Z; and
- a second processing unit comprising processing circuitry for receiving the intermediate output components buffered in the intermediate output buffer and generating the image data in said one specified column in the output matrix via the second IDCT procedure;

wherein the first processing unit and the second processing unit both comprise seven multipliers, the seven multipliers perform multiplication operations on the seven transform coefficients listed in the following:

$$\frac{1}{2}\cos\left(\frac{1}{16}\pi\right), \frac{1}{2}\cos\left(\frac{2}{16}\pi\right), \frac{1}{2}\cos\left(\frac{3}{16}\pi\right), \frac{1}{2}\cos\left(\frac{4}{16}\pi\right),$$

$$\frac{1}{2}\cos\left(\frac{5}{16}\pi\right), \frac{1}{2}\cos\left(\frac{6}{16}\pi\right), \text{ and } \frac{1}{2}\cos\left(\frac{7}{16}\pi\right)$$

for being multiplied with the DOT coefficients and the intermediate input components respectively and obtaining the multiplication results, the first processing unit calculates the discrete cosine transform coefficients in each row of the input matrix via the first IDCT procedure and outputs the outcome to the intermediate output buffer to be buffered, and while the complete intermediate output components in the corresponding one specified row of the intermediate output matrix Z are obtained; the complete intermediate output components are outputted to the second processing unit to obtain the complete image data in the corresponding one specified column of the output matrix, the IDCT procedure is an 8-8 IDCT procedure, and the input matrix has 8 rows and 8 columns of discrete cosine transform coefficients $x_{k,l}$, and wherein the first IDCT procedure transforms the discrete cosine transform coefficients $x_{k,l}$ into a plurality of intermediate output components $z_{v,k}$, and the equation of the first IDCT procedure is:

$$z_{v,k} = \sum_{l=0}^{7} c(l) * x_{k,l} * \cos\left(\frac{(2v+1)}{16} * l * \pi\right), \text{ wherein } c(0) = \frac{1}{2\sqrt{2}},$$

c(n)=½, n is integer and n=1~7: v, k, l are integer and v=0~7, k=0~7, l=0~7; and wherein the second IDCT procedure transforms the intermediate output components into the output matrix having 8 rows and 8 columns of image data $y_{h,v}$, and the equation of the second IDCT procedure is:

$$y_{h,v} = \sum_{k=0}^{7} c(k) * z_{v,k} * \cos\left(\frac{(2h+1)}{16} * k * \pi\right), \text{ wherein } c(0) = \frac{1}{2\sqrt{2}},$$

c(n)=½, n is integer and n=1-7: v, k, l are integer and v=0~7, k=0~7, l=0~7; wherein the second processing unit further comprises:
- a second permutation circuit for permuting and outputting the intermediate output components buffered in the intermediate output buffer according to the second IDCT procedure;
- a second multiplication circuit for multiplying the intermediate output components permuted and outputted by the second permutation circuit with a plurality of predetermined transform coefficients respectively and obtaining a plurality of corresponding multiplication products;
- a second summation circuit for summing up the multiplication products obtained by the second multiplication circuit according to the second IDCT procedure, and obtaining the image data in said one specified column of the output matrix Y; and
- a second processing unit controller for controlling the second permutation circuit, the second multiplication circuit, and the second summation circuit;

wherein the second permutation circuit comprises an adder/subtractor and a plurality of multiplexers, and the second processing unit controller controls the adder/subtractor and the multiplexers according to the second IDCT procedure, so that the discrete cosine transform coefficients are calculated, permuted and outputted to the corresponding multiplier; the second summation circuit comprises a plurality of invertors, a plurality of multiplexers, two adders, and an adder/subtractor, and the second processing unit controller controls the multiplexers and the adder/subtractor to obtain the image data of the specified column according to the second IDCT procedure.

35. The BOU of claim 34, wherein the basic operation unit further comprises a continuous control unit, each of the continuous control units being for outputting the input matrix X to at least one of the other BOU's continuous control unit, and for further generating at least one transform control signal together with each outputting of the input matrix X, the transform control signal indicating the decoded image data at least one specified column in the output matrix Y after the input matrix X is transformed via the IDCT procedure, wherein while receiving the transform control signal from another continuous control unit, each of the continuous control units generates a corresponding new transform control signal according to the received transform control signal.

36. The BOU of claim 34 wherein the first processing unit further comprises the following components:
- a first permutation circuit for permuting the input discrete cosine transform coefficients and then outputting the corresponding discrete cosine transform coefficients according to the first IDCT procedure;
- a first multiplication circuit for multiplying the discrete cosine transform coefficients permuted and outputted by the first permutation circuit with the transform coefficients respectively and obtaining a plurality of corresponding multiplication products;
- a first summation circuit for summing up the multiplication products obtained by the first multiplication circuit according to the first IDCT procedure, and obtaining the intermediate output components $z_{v,k}$ in said one specified row of the intermediate output matrix Z; and
- a first processing unit controller for controlling the first permutation circuit, the first multiplication circuit, and the first summation circuit.

37. The BOU of claim 36, wherein the first permutation circuit comprises an adder/subtractor and a plurality of multiplexers, and the first processing unit controller controls the adder/subtractor and the multiplexers according to the first IDCT procedure, so that the discrete cosine transform coefficients are calculated, permuted and then outputted to the corresponding multiplier.

* * * * *